(12) United States Patent
Kitano et al.

(10) Patent No.: US 10,269,522 B2
(45) Date of Patent: Apr. 23, 2019

(54) FUSE UNIT

(71) Applicants: Yazaki Corporation, Tokyo (JP);
TOYOTA JIDOSHA KABUSHIKI KAISHA, Toyota-shi, Aichi (JP)

(72) Inventors: Yoshinori Kitano, Shizuoka (JP);
Takahiro Shiohama, Shizuoka (JP);
Shinya Onoda, Shizuoka (JP);
Masanobu Suzuki, Okazaki (JP);
Shigeru Kimura, Okazaki (JP);
Yukinori Koie, Okazaki (JP)

(73) Assignees: YAZAKI CORPORATION,
Minato-ku, Tokyo (JP); TOYOTA JIDOSHA KABUSHIKI KAISHA,
Toyota-shi, Aichi-ken (JP)

( * ) Notice: Subject to any disclaimer, the term of this patent is extended or adjusted under 35 U.S.C. 154(b) by 0 days.

(21) Appl. No.: 15/535,854

(22) PCT Filed: Dec. 17, 2015

(86) PCT No.: PCT/JP2015/085388
§ 371 (c)(1),
(2) Date: Jun. 14, 2017

(87) PCT Pub. No.: WO2016/114069
PCT Pub. Date: Jul. 21, 2016

(65) Prior Publication Data
US 2017/0345601 A1 Nov. 30, 2017

(30) Foreign Application Priority Data
Jan. 14, 2015 (JP) ................. 2015-004865

(51) Int. Cl.
*H01H 85/02* (2006.01)
*H01H 85/20* (2006.01)
(Continued)

(52) U.S. Cl.
CPC ........ *H01H 85/0241* (2013.01); *H01H 85/02* (2013.01); *H01H 85/20* (2013.01);
(Continued)

(58) Field of Classification Search
CPC ......... H01H 85/0241; H01H 2085/025; H01H 85/20; H01H 2231/026; H01H 85/003; H01H 85/22
(Continued)

(56) References Cited

U.S. PATENT DOCUMENTS

| 5,643,693 | A | * | 7/1997 | Hill | ..................... H01M 2/1083 429/121 |
| 8,636,550 | B2 | | 1/2014 | Onoda et al. | |

(Continued)

FOREIGN PATENT DOCUMENTS

| CN | 202004047 U | 10/2011 |
| CN | 102696160 A | 9/2012 |

(Continued)

OTHER PUBLICATIONS

Shimizu Masaru, "Fixing Structure of Electrical Junction Box", Jul. 21, 2011, Yazaki Corp, Entire Document (Translation of JP 2011142772).*

(Continued)

*Primary Examiner* — Anatoly Vortman
*Assistant Examiner* — Stephen S Sul
(74) *Attorney, Agent, or Firm* — Sughrue Mion, PLLC

(57) ABSTRACT

A fuse unit includes: a fusible link which is connected to a battery terminal and of which a fuse is fused when overcurrent flows therein; and a holding mechanism including a base portion that is interposed between a post-standing surface and the battery terminal in a state in which the battery terminal is fastened to a battery post provided on the post-standing surface of a battery housing, and a holding portion that is connected to the base portion and holds the fusible link on the post-standing surface. Accordingly, a load acting on the battery post can be suppressed.

11 Claims, 21 Drawing Sheets

(51) Int. Cl.
*H01H 85/48* (2006.01)
*H01M 2/30* (2006.01)
*H01M 2/34* (2006.01)

(52) U.S. Cl.
CPC ............ *H01H 85/48* (2013.01); *H01M 2/305* (2013.01); *H01M 2/348* (2013.01); *H01H 2085/025* (2013.01); *H01M 2200/103* (2013.01); *H01M 2220/20* (2013.01)

(58) Field of Classification Search
USPC .................................................. 337/227, 168
See application file for complete search history.

(56) References Cited

U.S. PATENT DOCUMENTS

| | | | |
|---|---|---|---|
| 9,388,937 | B2 | 7/2016 | Shimizu |
| 2004/0007375 | A1* | 1/2004 | Higuchi ............. H01H 85/2045 174/50 |
| 2012/0309239 | A1 | 12/2012 | Onoda et al. |
| 2013/0027174 | A1* | 1/2013 | Masuda ............. H01H 85/0241 337/142 |
| 2014/0183310 | A1 | 7/2014 | Shimizu |
| 2017/0278662 | A1* | 9/2017 | Kitano ................... H01H 85/20 |

FOREIGN PATENT DOCUMENTS

| | | | | |
|---|---|---|---|---|
| CN | 102782946 | A | 11/2012 | |
| CN | 103650210 | A | 3/2014 | |
| CN | 103682225 | A | 3/2014 | |
| JP | 60-193227 | A | 10/1985 | |
| JP | 6-26141 | U | 4/1994 | |
| JP | 2006-236693 | A | 9/2006 | |
| JP | 2010021054 | A * | 1/2010 | ............. H01H 85/20 |
| JP | 2011142772 | A * | 7/2011 | ......... B60R 16/0238 |
| JP | 2011-258487 | A | 12/2011 | |
| JP | 2013-37949 | A | 2/2013 | |
| WO | 2013/008460 | A1 | 1/2013 | |

OTHER PUBLICATIONS

Onoda Shinya; Takahashi Yasuhiro; Taguchi Naoto, "Connection Structure of Fusible Link Unit", Jan. 28, 2010, Yazaki Corp, Entire Document (Translation of JP 2010021054).*
International Search Report for PCT/JP2015/085388 dated Mar. 8, 2016 [PCT/ISA/210].
Communication dated Jun. 26, 2018 from the State Intellectual Property Office of the P.R.C. in counterpart Application No. 201580068256.9.
Communication dated Jan. 16, 2019, from State Intellectual Property Office of the P.R.C. in counterpart application No. 201580068256.9.

* cited by examiner

FIG.1
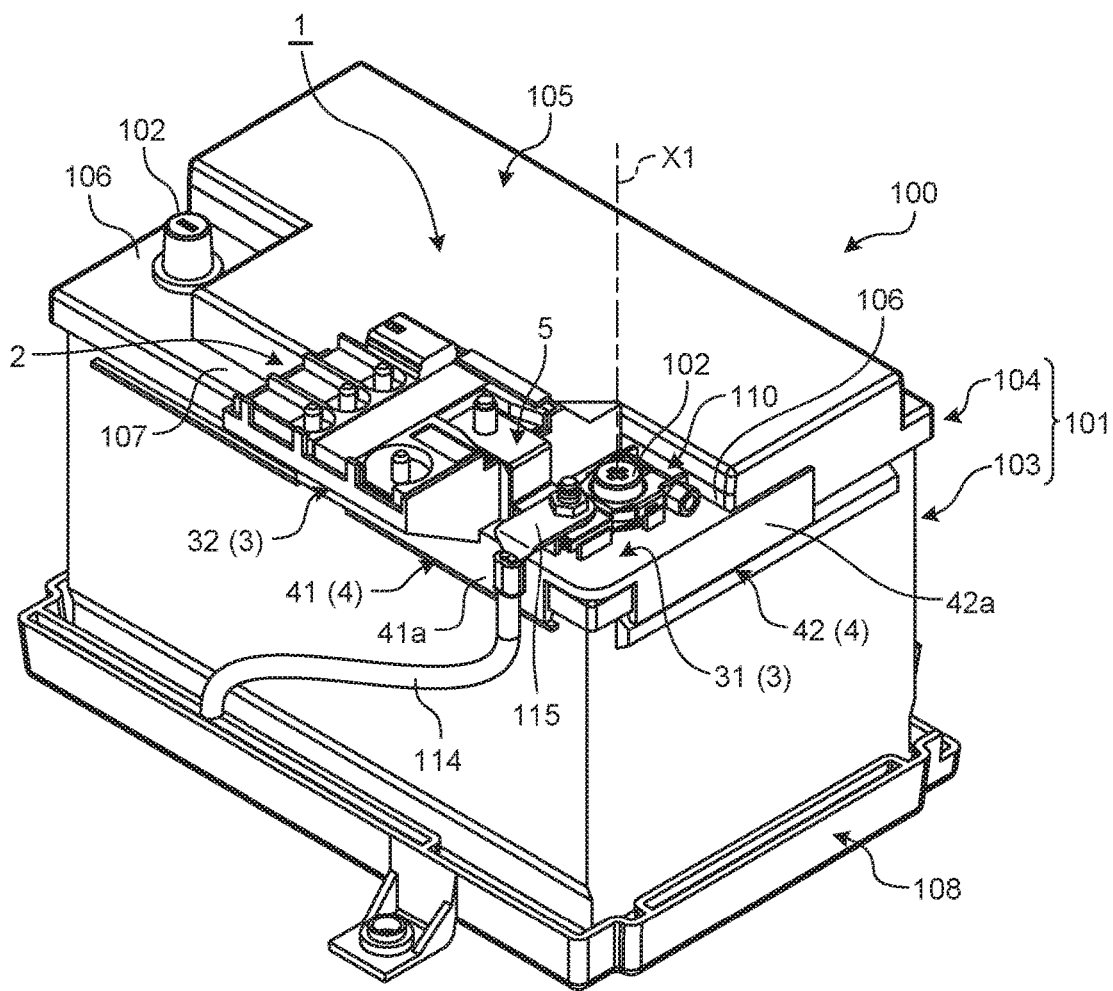
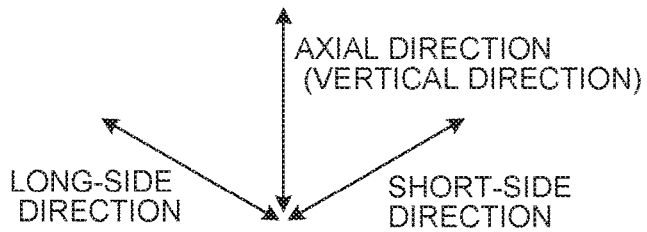

LONG-SIDE DIRECTION

SHORT-SIDE DIRECTION

FUSE UNIT

CROSS REFERENCE TO RELATED APPLICATIONS

This application is a National Stage of International Application No. PCT/JP2015/085388, filed on Dec. 17, 2015, which claims priority from Japanese Patent Application No. 2015-004865, filed on Jan. 14, 2015, the contents of all of which are incorporated herein by reference in their entirety.

FIELD

The present invention relates to a fuse unit.

BACKGROUND

As a fuse unit in the related art that is mounted on a vehicle or the like, for example, Patent Literature 1 discloses a fuse unit including a power supply-side terminal that is connected to a bolt standing on a battery terminal, load-side terminals that are connected to a load terminal, a conductor in which fuses provided over the power supply-side terminal and the load-side terminal are integrally formed in the shape of a flat plate, and a resin cover that covers the conductor while allowing connection portions between the power supply-side terminal and the load-side terminals to be exposed to the outside.

CITATION LIST

Patent Literature

Japanese Patent Application Laid-open No. 2013-037949

SUMMARY

Solution to Problem

Incidentally, the above-mentioned fuse unit disclosed in Patent Literature 1 has been adapted to be directly attached to, for example, a battery terminal. However, in a case in which the battery terminal is fastened to a battery post, there is room for further improvement on the suppression of a load acting on the battery post.

The present invention is made in view of the above-described circumstances, and an object of the present invention is to provide a fuse unit capable of suppressing a load acting on a battery post.

Solution to Problem

In order to achieve the above mentioned object, a fuse unit according to the present invention includes a fusible link that is connected to a battery terminal and of which a fuse is fused when overcurrent flows therein; and a holding mechanism including a base portion that is interposed between a post-standing surface and the battery terminal in a state in which the battery terminal is fastened to a battery post provided on the post-standing surface of a battery housing, and a holding portion that is connected to the base portion and holds the fusible link on the post-standing surface.

Further, in the fuse unit, the holding mechanism may include a mounting portion that mounts the battery terminal on the base portion at a position where the battery terminal is capable of being fastened to the battery post.

Further, the fuse unit may further include a terminal positioning mechanism that includes a plurality of recesses provided on one of a side of the battery terminal and a side of the base portion and a protrusion provided on the other of the side of the battery terminal and the side of the base portion and fitted to any of the plurality of recesses, and positions the battery terminal on the base portion at a position where the battery terminal is capable of being fastened to the battery post.

Advantageous Effects of Invention

Since the fuse unit according to the invention holds the fusible link on the post-standing surface of the battery housing by the holding portion connected to the base portion of the holding mechanism and receives the load of the fusible link on the post-standing surface, a load acting on the battery terminal from the fuse unit can be suppressed. Therefore, an effect of suppressing a load acting on the battery post is obtained.

BRIEF DESCRIPTION OF DRAWINGS

FIG. 1 is a perspective view illustrating the schematic structure of a battery to which a fuse unit according to a first embodiment is applied.

DESCRIPTION OF EMBODIMENTS

Embodiments of the invention will be described in detail below with reference to the drawings. Meanwhile, the invention is not limited by the embodiments. Further, components of the following embodiments include components that can be easily substituted by those skilled in the art or components that are substantially the same as the components.

First Embodiment

Figure 2:
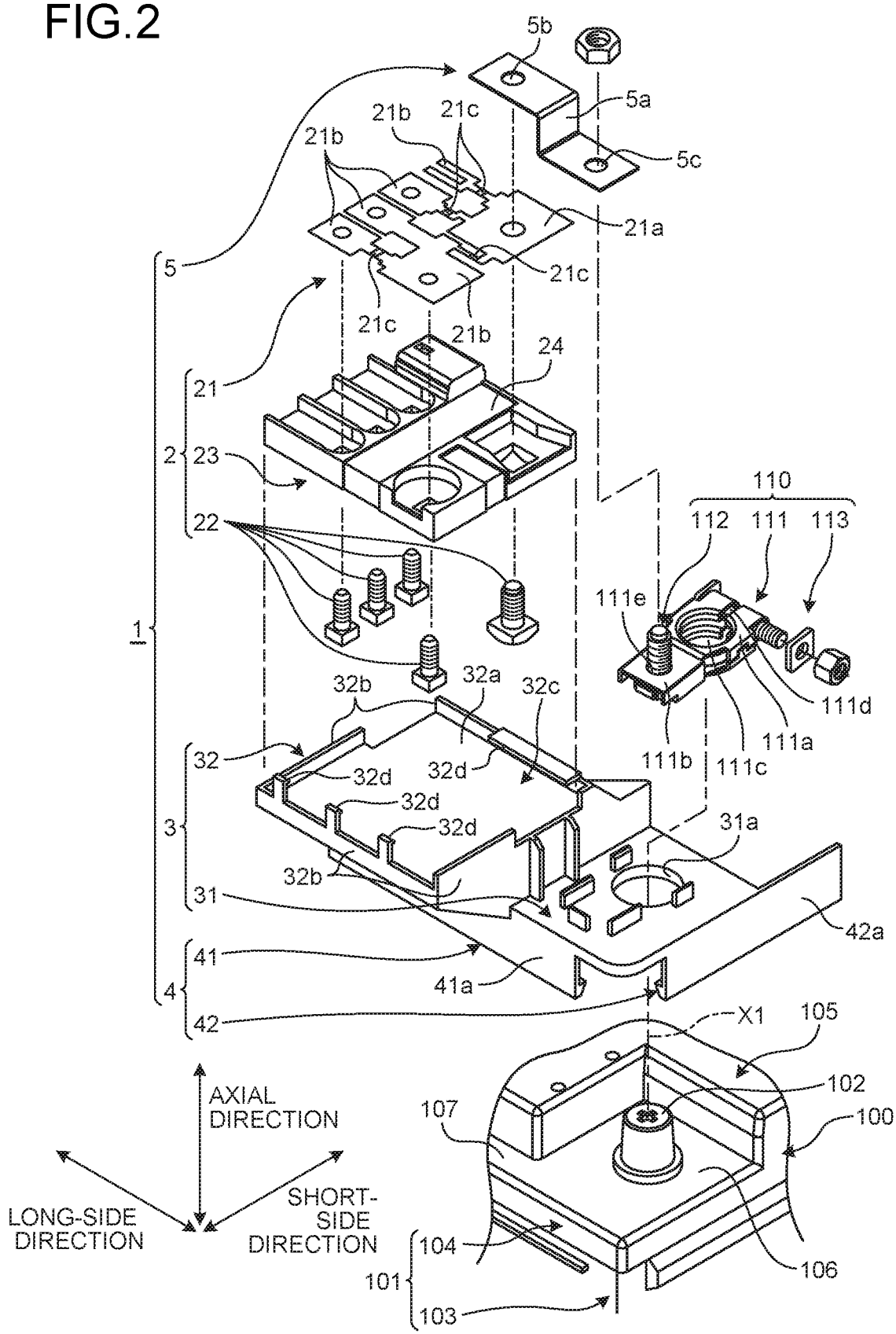
FIG. 2 is an exploded perspective view illustrating the schematic structure of the fuse unit according to the first embodiment.
Figure 3:
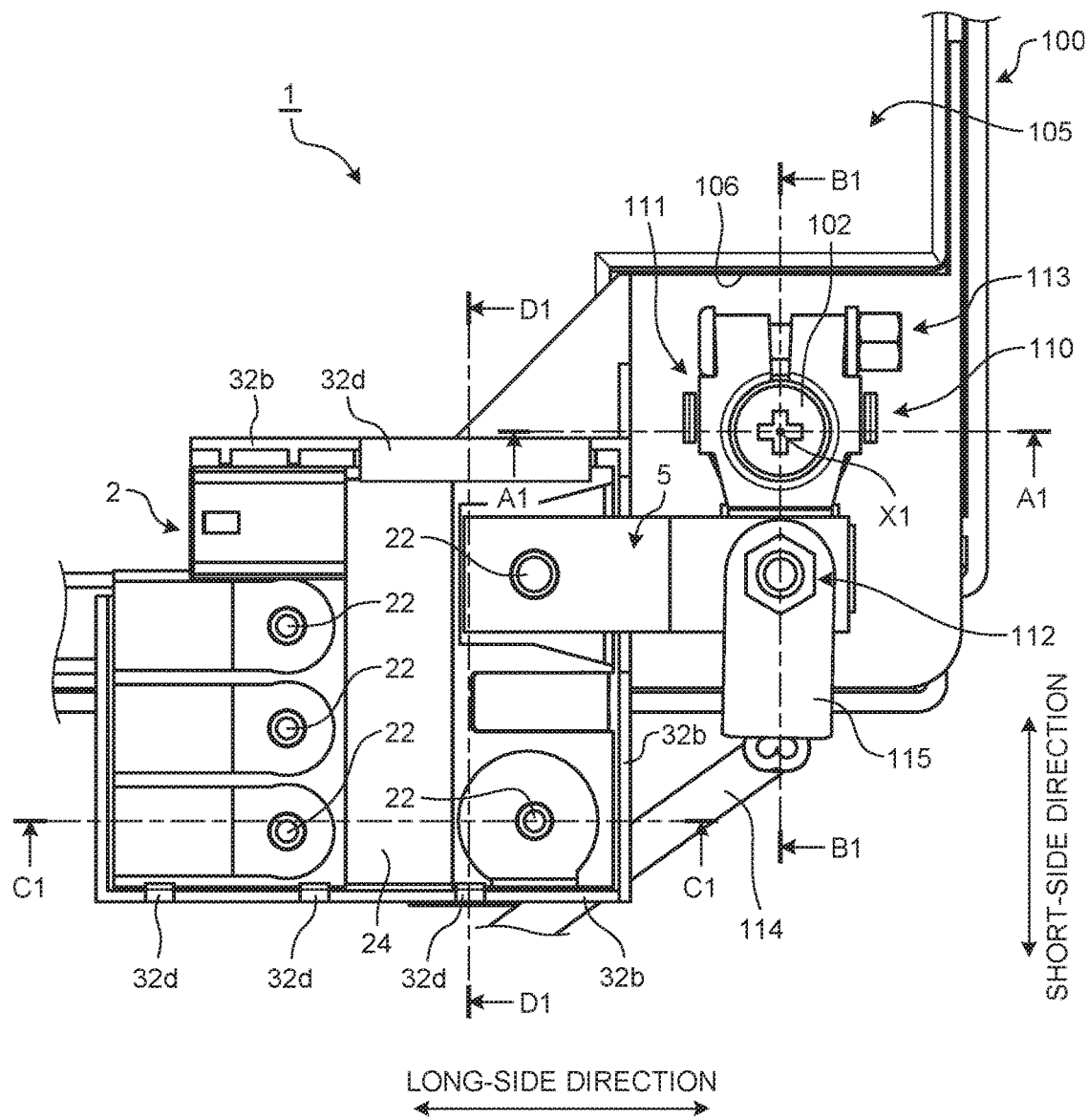
FIG. 3 is a plan view illustrating the schematic structure of the fuse unit according to the first embodiment.
Figure 4:
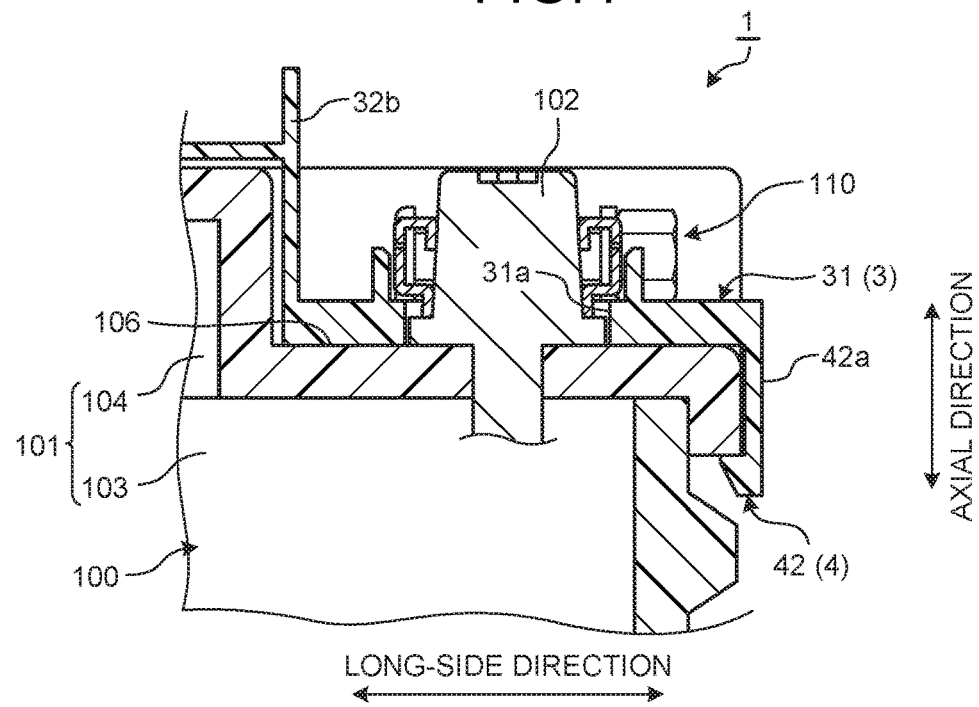
FIG. 4 is a cross-sectional view taken along line A1-A1 of FIG. 3.
Figure 5:
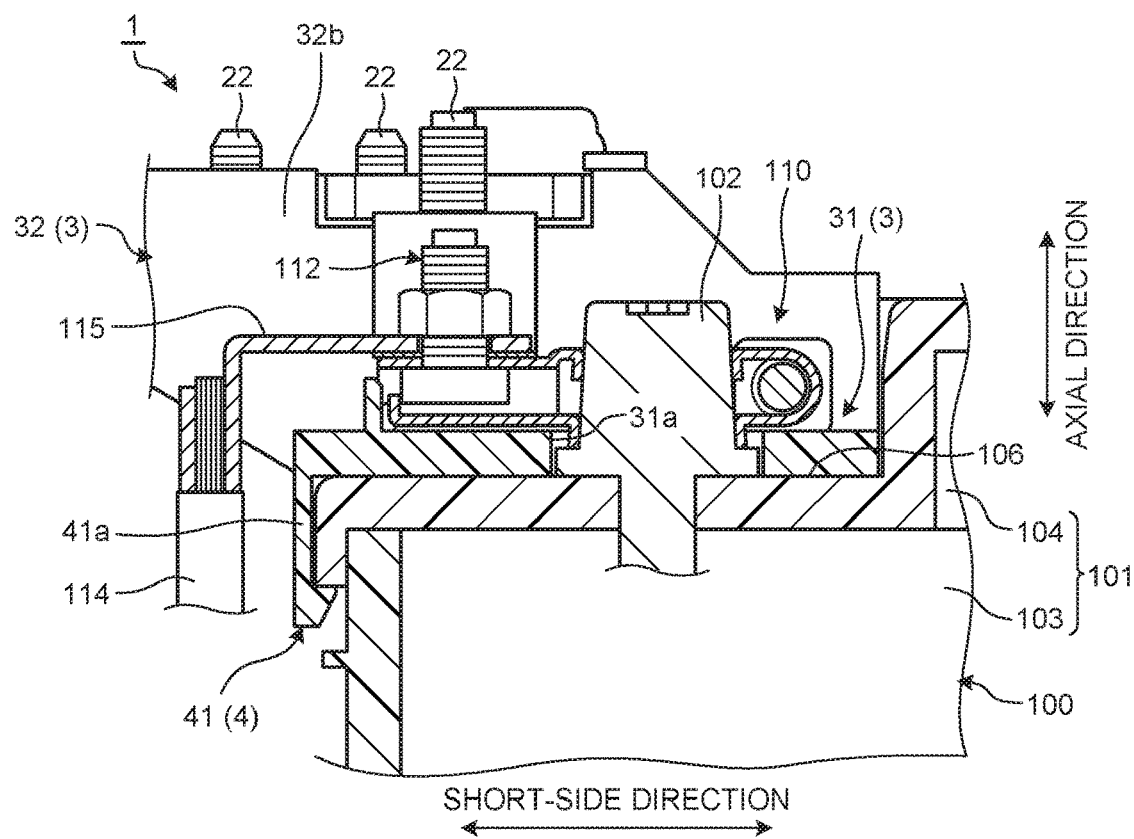
FIG. 5 is a cross-sectional view taken along line B1-B1 of FIG. 3.
Figure 6:
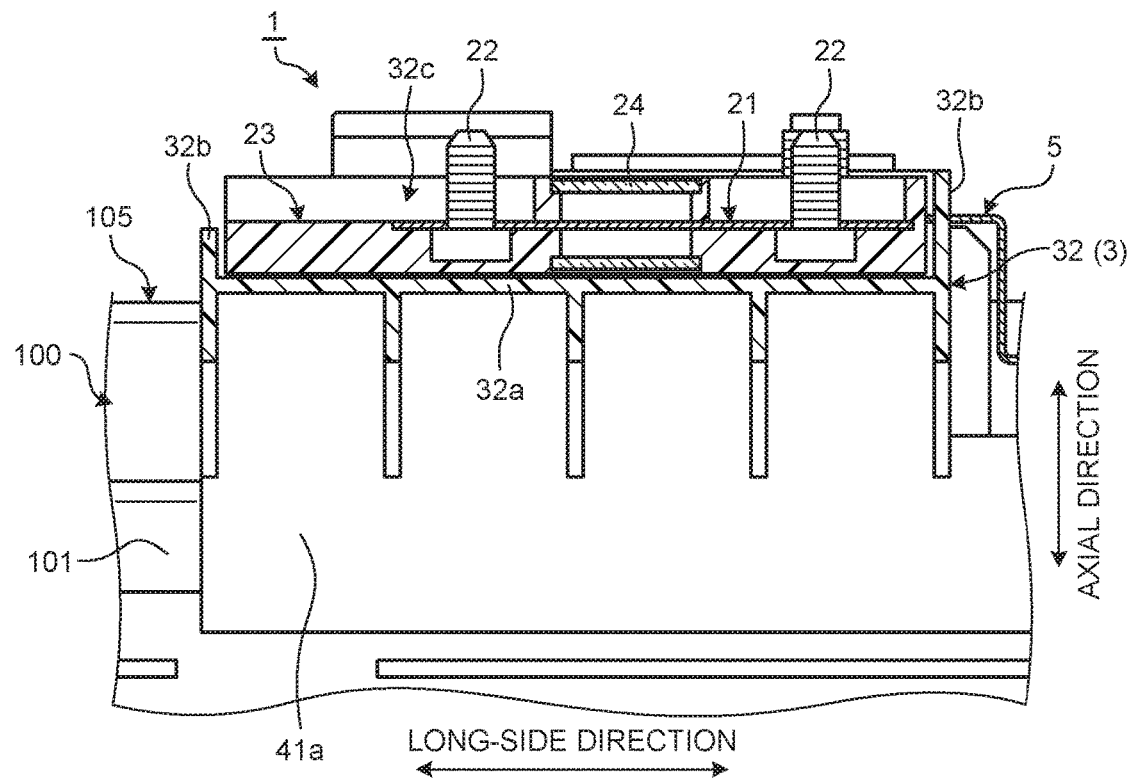
FIG. 6 is a cross-sectional view taken along line C1-C1 of FIG. 3.
Figure 7:
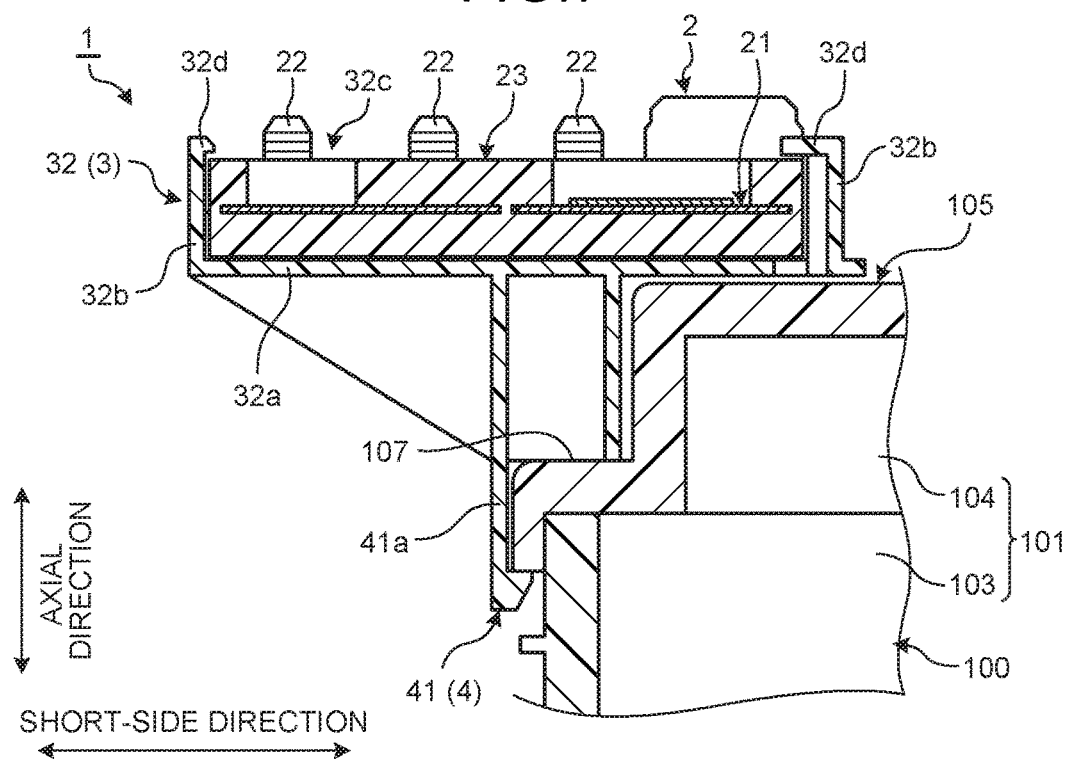
FIG. 7 is a cross-sectional view taken along line D1-D1 of FIG. 3.

FIG. 1 is a perspective view illustrating the schematic structure of a battery to which a fuse unit according to a first embodiment is applied. FIG. 2 is an exploded perspective view illustrating the schematic structure of the fuse unit according to the first embodiment. FIG. 3 is a plan view illustrating the schematic structure of the fuse unit according to the first embodiment. FIG. 4 is a cross-sectional view taken along line A1-A1 of FIG. 3. FIG. 5 is a cross-sectional view taken along line B1-B1 of FIG. 3. FIG. 5 is a cross-sectional view taken along, line C1-C1 of FIG. 3. FIG. 7 is a cross-sectional view taken along line D1-D1 of FIG. 3. Meanwhile, a fuse element and stud bolts are actually embedded in a housing by insert molding, but are schematically illustrated in FIG. 2 so as to be disassembled for easy understanding of description.

Further, a direction along a central axis X1 of a battery post 102 will be referred to as an axial direction in the following description. An axial direction is typically a direction along a vertical direction in a state in which a battery 100 is mounted on a vehicle or the like, and a post-standing surface 105 of a battery housing 101 to be described below typically corresponds to the upper surface of the battery housing 101 in the vertical direction. Furthermore, here, for easy understanding of the following description, for convenience sake, one of two directions orthogonal to the axial direction will be referred to as a long-side direction (a first width direction) and the other thereof will be referred to as a short-side direction (a second width direction). The axial direction, the long-side direction, and the short-side direction are orthogonal to each other.

As illustrated in FIGS. 1, 2, 3, 4, 5, 6, and 7, a fuse unit 1 according to this embodiment is applied to a battery terminal 110 that is connected to a battery 100 mounted on a vehicle or the like, and is used for the overcurrent protection of an electrical circuit.

Here, the battery 100 and the battery terminal 110 to which the fuse unit 1 is to be applied will be described first with reference to FIGS. 1, 2, and 3.

For example, the battery 100 is mounted on a vehicle or the like as an electrical storage device. The battery 100 includes a battery housing 101 that houses battery fluid and various components of the battery 100, battery posts 102 are provided in the battery housing 101, and the like. The battery housing 101 includes a substantially rectangular box-shaped housing body 103 of which any one surface is opened and a lid member 104 that closes the opened surface, and is formed in a substantially rectangular parallelepiped shape as a whole. Here, a long side of the battery housing 101 is along the long-side direction and a short side thereof is along the short-side direction, but the battery housing 101 is not limited thereto. The battery posts 102 are made of lead or the like having conductivity, and stand on a post-standing surface 105 of the lid member 104. The post-standing surface 105 is the surface of the battery housing 101 on which the battery posts 102 stand. Here, the post-standing surface 105 is, for example, the upper surface of the lid member 104 of the battery housing 101 in the vertical direction in a state in which the battery 100 is mounted on a vehicle or the like. The post-standing surface 105 is the entire upper surface, which also includes the bottoms of recesses 106 to be described below, of the lid member 104 in the vertical direction. The battery posts 102 have a substantially columnar shape, and stand on the post-standing surface 105 so as to protrude in a positional relationship in which the central axes X1 are orthogonal to the post-standing surface 105. In more detail, the battery posts 102 of this embodiment stand in recesses 106 that are formed near the positions of corners on the post-standing surface 105. The recesses 106 are portions that are sunk in a substantially rectangular shape near the positions of corners on the post-standing surface 105. The battery posts 102 stand in the recesses 106. Typically, the battery post 102 is tapered so that the diameter of the battery post 102 is reduced toward the tip thereof in the axial direction. That is, the battery post 102 has a tapered shape in which the outer diameter of a tip is smaller than the outer diameter of a base end.

Meanwhile, a pair of battery posts 102 and a pair of recesses 106 are provided in the long-side direction so as to form a pair of a positive electrode and a negative electrode, and the pair of recesses 106 is communicated to each other through a communication recess 107 (also see FIG. 7 and the like). The communication recess 107 is formed along the edge portion of the lid member 104 that is parallel to the long-side direction. A case in which the fuse unit 1 is applied to the battery terminal 110 provided on the battery post 102 corresponding to the positive electrode will be described in the following description, but the invention is not limited thereto. Meanwhile, the battery 100 is installed at a predetermined position on the vehicle through an installation tray 108 or the like that is provided on the lower side in the vertical direction.

The battery terminal 110 is a component that is mounted on the battery post 102 to electrically connect the battery 100 to metal fittings, such as a terminal 115, provided at the end of a wire 114 of a body, such as a vehicle, on which the battery 100 is to be mounted. The batter terminal 110 includes a body portion 111, a stud bolt 112, and a tightening portion 113. For example, the body portion 111 is formed by the press folding of a metal plate having conductivity so that an annular portion 111a, a bolt holding portion 111b, and the like are integrated with each other. A post insertion hole 111c into which the battery post 102 is to be inserted and a slit 111d that continues to the post insertion hole 111c are formed at the annular portion 111a. The post insertion hole 111c is formed in a substantially circular shape, and the inner peripheral wall surface of the post insertion hole 111c has a taper corresponding to the taper of the above-mentioned battery post 102 so that the inner peripheral surface of the post insertion hole 111c is in contact with the battery post 102 in a state in which the battery post 102 is inserted into the post insertion hole 111c. For example, the bolt holding portion 111b is a portion that holds the stud bolt 112 by being folded in a state in which the stud bolt 112 is inserted into a bolt insertion hole 111e. The stud bolt 112 has conductivity and metal fittings, such as the terminal 115, provided at the end of the wire 114 is electrically connected to a shaft portion of the stud bolt 112 exposed from the bolt insertion hole 111e in a state in which the stud bolt 112 is held by the bolt holding portion 111b (see FIGS. 1, 3, and the like). The tightening portion 113 is to fasten the annular portion 111a to the battery post 102 in a state in which the battery post 102 is inserted into the post insertion hole 111c. The tightening portion 113 includes, for example, a bolt and a nut, and is assembled to the body portion 111 in a positional relationship in which the bolt crosses the above-mentioned slit 111d. Further, the nut is threadedly engaged with the tip portion of the bolt, so that the tightening portion 113 tightens the annular portion 111a and fastens the battery terminal 110 to the battery post 102.

Then, since the fuse unit 1 of this embodiment holds a fusible link 2 on the post-standing surface 105, here, the upper surface of the battery housing 101 in the vertical direction by a protector 3 serving as a holding mechanism in which a base portion 31 and a holding portion 32 are formed integrally with each other in the battery 100 of which the battery terminal 110 is fastened to the battery post 102 as described above, a load acting on the battery post 102 can be suppressed.

Specifically, the fuse unit 1 includes the fusible link 2 and the protector 3 serving as a holding mechanism as illustrated in FIGS. 1, 2, 3, 4, 5, 6, and 7. The fuse unit 1 of this embodiment further includes a locking mechanism 4 and a connecting bus bar 5.

The fusible link 2 is a component which is connected to the battery terminal 110 and of which fuse bodies 21c are fused when overcurrent flows therein. The fusible link 2 includes a fuse element 21 that is provided with the fuse bodies 21c, stud bolts 22 that are connected to the fuse element 21, and a housing 23 that supports the fuse element 21 and is made of a resin.

The fuse element 21 is a plate-like conductor having conductivity, and is formed of a metal bus bar. The fuse element 21 includes a power supply-side terminal 21a that is connected to the battery terminal 110 through the connecting bus bar 5 or the like, a plurality of load-side terminals 21b that are connected to load terminals, and fuse bodies 21c that are provided over the power supply-side terminal 21a and the respective load-side terminals 21b. The power supply-side terminal 21a, the plurality of load-side terminals 21b, and the fuse bodies 21c are integrally formed in the shape of a flat plate. The respective load-side terminals 21b have various shapes according to the shapes of the load terminals or the like. The fuse bodies 21c electrically connect the power supply-side terminal 21a to the load-side terminals 21b, respectively. Each of the fuse bodies 21c has, for example, a structure in which a low-melting-point metal chip is welded to a narrowed strip-shaped conductive portion, and is fused to cut off a corresponding current path when overcurrent flows in the fuse body 21c. Here, the overcurrent of the fuse body 21c is, for example, preset current that is equal to or higher than rated current. That is, each of the fuse bodies 21c is fused when preset current equal to or higher than rated current flows in the fuse body 21c. The rated current of each fuse body 21c is determined according to the current of a circuit to be protected. Each of the power supply-side terminal 21a and the respective load-side terminals 21b is provided with bolt mounting hole and a connector-connection shape. For example, the stud bolt 22 is joined to the bolt mounting hole.

The respective stud bolts 22 have conductivity, and load terminals of an external circuit are electrically connected to the respective stud bolts 22.

The housing 23 is a block-shaped body that is made of an insulating resin material and supports the fuse element 21 and the stud bolts 22. The fuse element 21 and the stud bolts 22 of the fusible link 2 of this embodiment are embedded in and integrated with the housing 23 by, for example, insert molding or the like (see FIGS. 6, 7, and the like). The fusible link 2 is formed in the shape of a substantially rectangular box as a whole.

Meanwhile, since a portion of the fusible link 2 corresponding to the respective fuse bodies 21c is covered with a transparent cover member 24 made of a resin, the respective fuse bodies 21c can be visually observed through the transparent cover member 24.

The protector 3 is to hold the fusible link 2 on the post-standing surface 105. The protector 3 includes a base portion 31 and a holding portion 32, and the base portion 31 and the holding portion 32 are integrally formed with an insulating resin material.

The base portion 31 is a portion that is interposed between the post-standing surface 105 and the battery terminal 110 in a state in which the battery terminal 110 is fastened to the battery post 102 provided on the post-standing surface 105 of the battery housing 101. The base portion 31 is provided around the battery post 102. Here, the base portion 31 is formed in the shape of a rectangular plate, and is provided with a post insertion hole 31a into which the battery post 102 is to be inserted. The post insertion hole 31a is formed to be sufficiently larger than the battery post 102 on the basis of tolerance and the like allowed for the battery 100 and the like. The base portion 31 is formed so as to have a size and a shape, which allow the base portion 31 to be disposed in the recess 106 of the post-standing surface 105, in a state in which the battery post 102 is inserted into the post insertion hole 31a. Meanwhile, the base portion 31 may include a post insertion notch through which the battery post 102 can pass, instead of the post insertion hole 31a.

The holding portion 32 is connected to the base portion 31 and is to hold the fusible link 2 on the post-standing surface 105. The holding portion 32 includes a bottom 32a that is formed in the shape of a substantially rectangular plate and side walls 32b that stand so as to surround the peripheral edge of the bottom 32a, and the bottom 32a and the side walls 32b are integrated with each other and are formed in the shape of a tray (dish). The side walls 32b stand to surround four sides of the bottom 32a and to protrude toward one side in the axial direction, here, toward the upper side in the vertical direction in a state in which the protector 3 is assembled on the post-standing surface 105 of the battery 100 (hereinafter, simply referred to as an "assembled state"). Meanwhile, the side walls 32b may be notched at predetermined portions thereof according to, for example, the shapes and the like of the terminals or connectors to be connected to the fusible link 2. A housing space portion 32c, which is used to house and hold the fusible link 2, is partitioned by the bottom 32a and the side walls 32b of the holding portion 32. The housing space portion 32c is opened upward in the vertical direction in a state in which the protector 3 is assembled on the post-standing surface 105 of the battery 100. The housing space portion 32c is formed to have a size and a shape that allow the fusible link 2 to be fitted to the housing space portion 32c. Further, a plurality of locking claw portions 32d are formed at end portions (upper end portions in the vertical direction in the assembled state) of the side walls 32b of the holding portion 32. The locking claw portions 32d are formed in a hook shape in which the end portions of the side walls 32b are bent (see FIG. 7 and the like). When the plurality of locking claw portions 32d of the holding portion 32 are engaged with the outer edge portions of the housing 23 of the fusible link 2 at predetermined positions in a state in which the fusible link 2 is fitted to the housing space portion 32c, the fusible link 2 can be locked to the housing space portion 32c.

Further, the holding portion 32 of this embodiment having the above-mentioned structure is formed integrally with the base portion 31 so as to be adjacent to the base portion 31 in the long-side direction. The side wall 32b facing the base portion 31 extends downward in the vertical direction so as to correspond to a difference in level caused by the recess 106 formed on the post-standing surface 105, and the holding portion 32 continues to the base portion 31 at the lower end portion of the side wall 32b. In a state in which the protector 3 is assembled to the battery 100 in a positional relationship in which the battery post 102 is inserted into the post insertion hole 31a of the base portion 31 and the base portion 31 is positioned in the recess 106, at least a part of the holding portion 32 is positioned on the post-standing surface 105 and the holding portion 32 places and holds the fusible link 2 on the post-standing surface 105. The holding portion 32 is placed so that the back surface (the surface opposite to the housing space portion 32c) of the bottom 32a is in contact with the post-standing surface 105 in the assembled state. Accordingly, the protector 3 receives the load of the fusible link 2 on the post-standing surface 105 through the holding portion 32.

The locking mechanism 4 is to lock the protector 3, which has the above-mentioned structure, on the post-standing surface 105. The locking mechanism 4 of this embodiment includes a locking claw portion 41 and a locking claw portion 42 that lock the protector 3 on the post-standing surface 105 by being engaged with the battery housing 101. A plurality of locking claw portions 41 and 42, here, two locking claw portions are provided and are engaged with a plurality of surfaces of the battery housing 101, here, two surfaces of the battery housing 101 orthogonal to each other. The locking claw portions 41 and 42 are formed integrally with the base portion 31 and the holding portion 32 of the protector 3 through plate-like portions (arm portions) 41a and 42a extending in the vertical direction in the assembled state, respectively. The plate-like portions 41a and 42a extend downward from the base portion 31 and the holding portion 32 in the vertical direction in the assembled state, and are formed integrally with the base portion 31 and the holding portion 32.

The locking claw portion 41 and the plate-like portion 41a are formed at a position facing the side surface of the battery housing 101 along the long-side direction of the lid member 104 in the assembled state, here, the side surface that is positioned near the recess 106 formed on the post-standing surface 105 of the lid member 104 and is formed along the long-side direction. The locking claw portion 41 and the plate-like portion 41a are formed so as to extend in the long-side direction over the base portion 31 and the holding portion 32. The locking claw portion 42 and the plate-like portion 42a are formed at a position facing the side surface of the battery housing 101 along the short-side direction of the lid member 104 in the assembled state, here, the side surface of the battery housing 101 that is positioned near the recess 106 formed on the post-standing surface 105 of the lid member 104 and is formed along the short-side direction. The locking claw portion 42 and the plate-like portion 42a are formed so as to extend in the short-side direction at the base portion 31.

The locking claw portions 41 and 42 are formed in a hook shape in which the end portions (lower end portions in the vertical direction in a state in which the protector 3 is assembled on the post-standing surface 105 of the battery 100) of the respective plate-like portions 41a and 42a are bent (see FIGS. 4, 5, 7, and the like). Here, the locking claw portions 41 and 42 are engaged with the lower end faces of the edge portions of the lid member 104 of the battery housing 101 in the vertical direction. When the locking claw portions 41 and 42 are engaged with the lower end face of the lid member 104 in the vertical direction at predetermined positions in a state in which the protector 3 is assembled on the post-standing surface 105 of the battery 100, the locking mechanism 4 can lock the protector 3 on the post-standing surface 105.

The connecting bus bar 5 is a plate-like conductor having conductivity, and is to electrically connect the fuse element 21 to the battery terminal 110. The connecting bus bar 5 is a plate-like metal bus bar, and a stepped portion 5a is formed at the connecting bus bar 5 so as to correspond to a difference in level caused by the recess 106 formed on the post-standing surface 105 and bolt holes 5b and 5c are formed at both end portions of the connecting bus bar 5. When the stud bolt 22 of the power supply-side terminal 21a is inserted into the bolt hole 5b and a nut is fastened to the stud bolt 22 and the stud bolt 112 of the battery terminal 110 is inserted into the bolt hole 5c and a nut is fastened to the stud bolt 112, the connecting bus bar 5 electrically connects the stud bolt 22 of the power supply-side terminal 21a to the shaft portion of the stud bolt 112 of the battery terminal 110.

When the fusible link 2 is fitted to the housing space portion 32c of the holding portion 32 of the protector 3 and the plurality of locking claw portions 32d are engaged with the housing 23 of the fusible link 2 in the fuse unit 1 having the above-mentioned structure, the fusible link 2 is locked to the housing space portion 32c. Then, the protector 3 of the fuse unit 1 is assembled on the post-standing surface 105 of the battery 100 together with the fusible link 2 in a positional relationship in which the battery post 102 is inserted into the post insertion hole 31a of the base portion 31 of the protector 3 and the base portion 31 is positioned in the recess 106. At this time, when the locking claw portions 41 and 42 of the locking mechanism 4 are engaged with the lower end face of the lid member 104 in the vertical direction, the fuse unit 1 can lock the fusible link 2 and the protector 3 on the post-standing surface 105.

Since a part of at least the protector 3 of the fuse unit 1 is positioned on the post-standing surface 105 of the battery 100 in this way, the fusible link 2 can be placed and held en the post-standing surface 105. Then, after the battery terminal 110 is assembled to the battery post 102, the connecting bus her 5 of the fuse unit 1 is provided so as to connect the stud bolt 22 of the power supply-side terminal 21a of the fuse element 21 to the battery terminal 110 and the bolts, nuts, and the like of the respective portions are tightened. As a result, the battery terminal 110 is fastened to the battery post 102, and the battery terminal 110 and the fusible link 2 are connected to each other. At this time, the connecting bus bar 5 also functions as a regulating member that regulates the assembly angle of the battery terminal 110 with respect to the battery post 102.

Meanwhile, a case in which the protector 3 is assembled on the post-standing surface 105 together with the fusible link 2 after the fusible link 2 is assembled to the protector 3 has been described here. However, the invention is not limited thereto, and the fusible link 2 may be assembled to the protector 3 after the protector 3 is assembled on the post-standing surface 105. Further, the terminal 115 or the like, which is provided at the end of the above-mentioned wire 114, is also connected to the stud bolt 112 of the battery terminal 110 together with the connecting bus bar 5.

The above-mentioned fuse unit 1 includes the fusible link 2 which is connected to the battery terminal 110 and of which the fuse bodies 21c are fused when overcurrent flows therein, and the protector 3. The protector 3 includes the base portion 31 that is interposed between the post-standing surface 105 and the battery terminal 110 in a state in which the battery terminal 110 is fastened to the battery post 102 provided on the post-standing surface 105 of the battery housing 101, and the holding portion 32 that is connected to the base portion 31 and holds the fusible link 2 on the post-standing surface 105.

Accordingly, since the fuse unit 1 holds the fusible link 2 on the post-standing surface 105 of the battery housing 101 by the holding portion 32 connected to the base portion 31 of the protector 3 and receives the load of the fusible link 2 on the post-standing surface 105, a load acting on the battery terminal 110 from the fuse unit 1 can be suppressed. Therefore, a load acting on the battery post 102 can be suppressed. Further, in a case in which a space required to install the fuse unit 1 cannot be ensured around the side surfaces of the battery housing 101, an installation space can be ensured on the post-standing surface 105 of the battery housing 101 (the upper surface of the battery housing 101 in the vertical direction) so that the fusible link 2 of the fuse unit 1 can be disposed. Accordingly, the fusible link 2 can be appropriately provided.

Further, since the protector 3 and the battery terminal 110 are separately assembled to the battery 100 in the above-mentioned fuse unit 1, the battery terminal 110 can be appropriately fastened to the battery post 102 regardless of, for example, tolerance and the like allowed for the battery 100 and the like.

Furthermore, the above-mentioned fuse unit 1 includes the locking mechanism 4 that locks the protector 3 on the post-standing surface 105. Accordingly, the fuse unit 1 can reliably assemble the protector 3 and the fusible link 2 on the post-standing surface 105 by the locking mechanism 4.

In addition, according to the above-mentioned fuse unit 1, the locking mechanism 4 includes the locking claw portions 41 and 42 that lock the protector 3 on the post-standing surface 105 by being engaged with the battery housing 101. Accordingly, when the locking claw portions 41 and 42 are engaged with the battery housing 101, the fuse unit 1 can lock the protector 3 and the fusible link 2 on the post-standing surface 105.

Moreover, according to the above-mentioned fuse unit 1, a plurality of locking claw portions 41 and 42 are provided and are engaged with a plurality of surfaces of the battery housing 101. Accordingly, since the locking claw portions 41 and 42 are engaged with the plurality of surfaces of the battery housing 101 and can lock the protector 3 on the post-standing surface 105, the fuse unit 1 can more reliably assemble the protector 3 on the post-standing surface 105.

Second Embodiment

Figure 8:
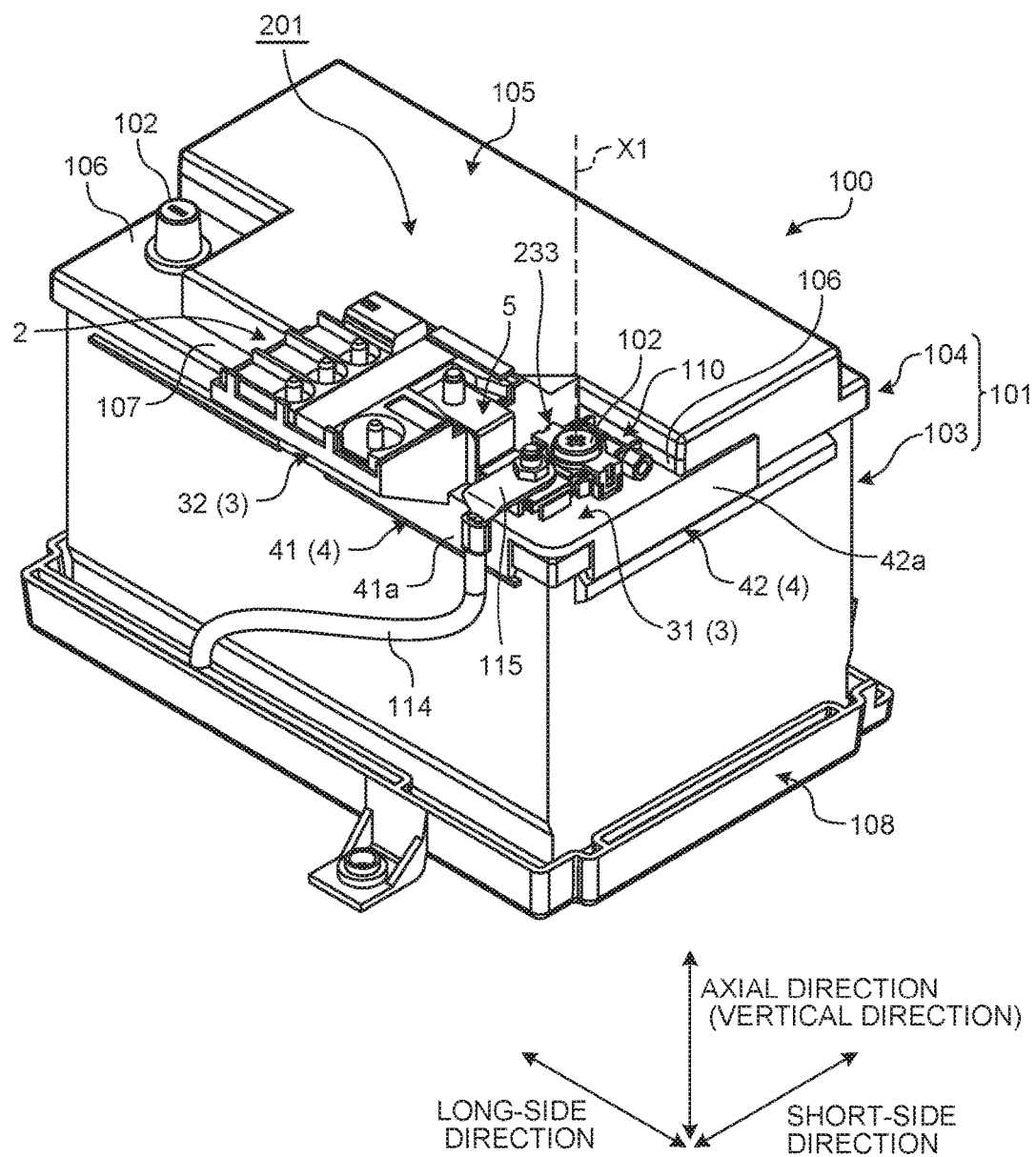
FIG. 8 is a perspective view illustrating the schematic structure of a battery to which a fuse unit according to a second embodiment is applied.
Figure 9:
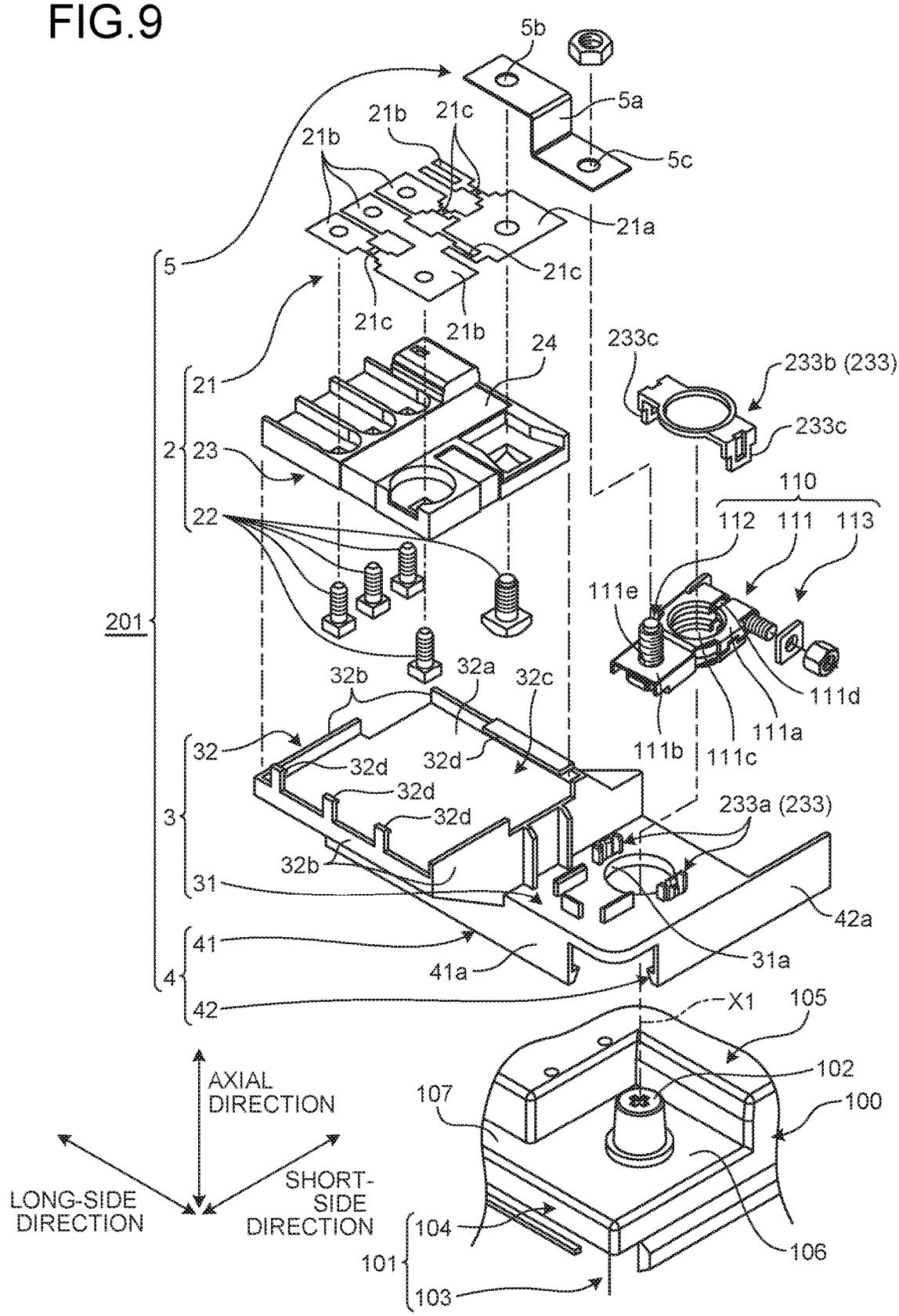
FIG. 9 is an exploded perspective view illustrating the schematic structure of the fuse unit according to the second embodiment.
Figure 10:
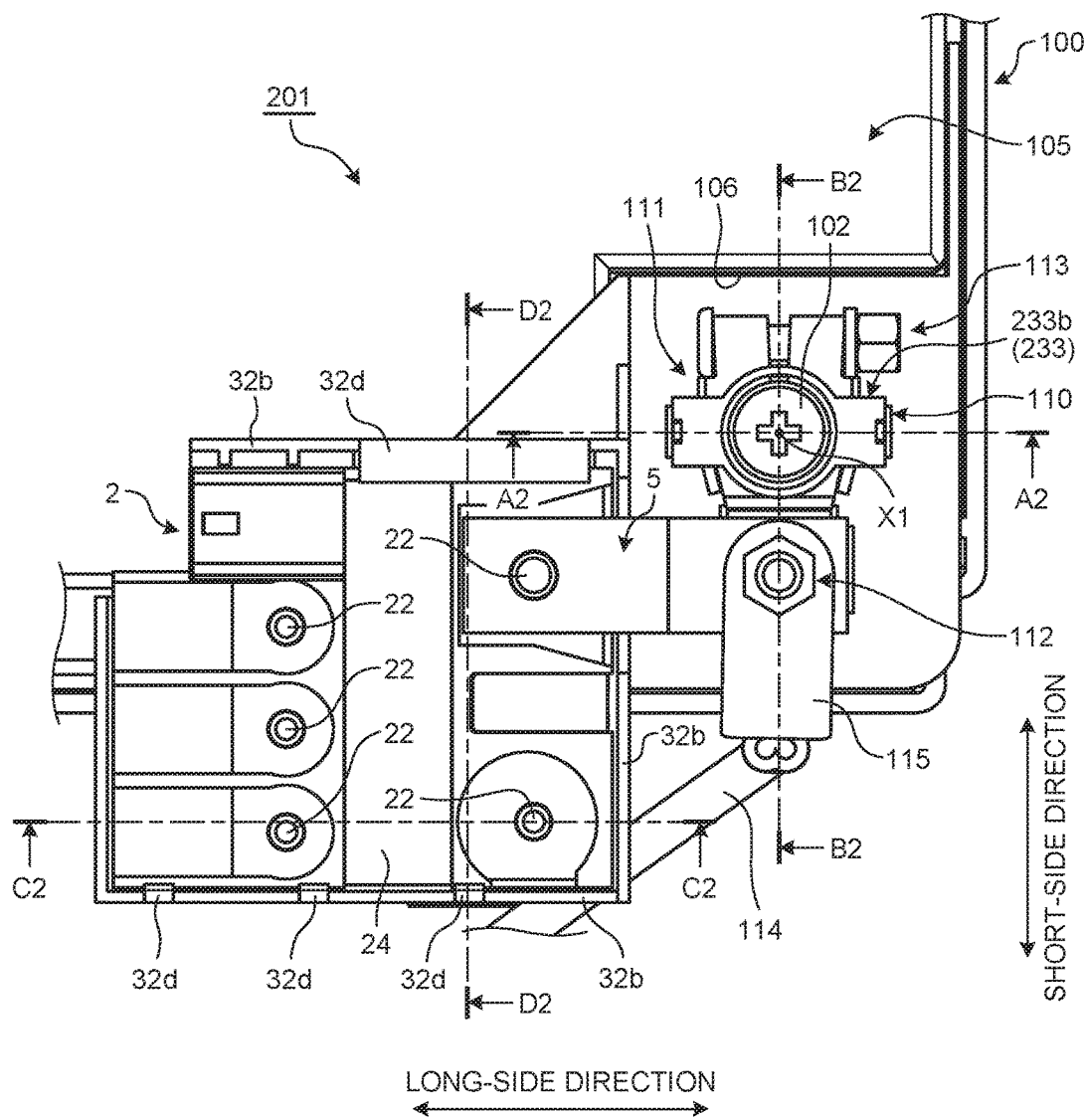
FIG. 10 is a plan view illustrating the schematic structure of the fuse unit according to the second embodiment.
Figure 11:
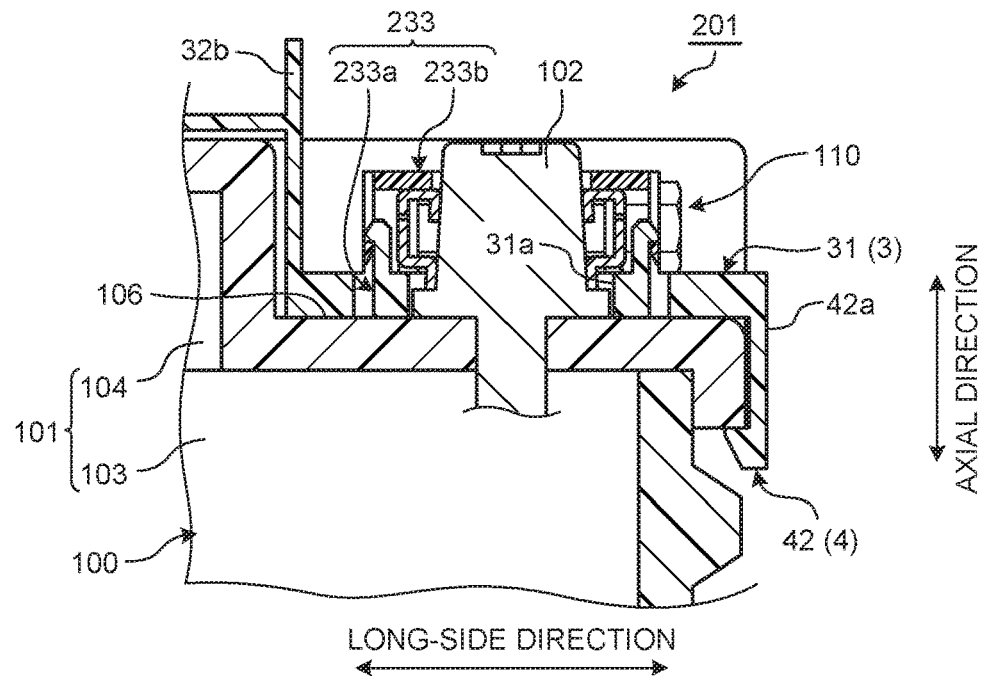
FIG. 11 is a cross-sectional view taken along line A2-A2 of FIG. 10.
Figure 12:
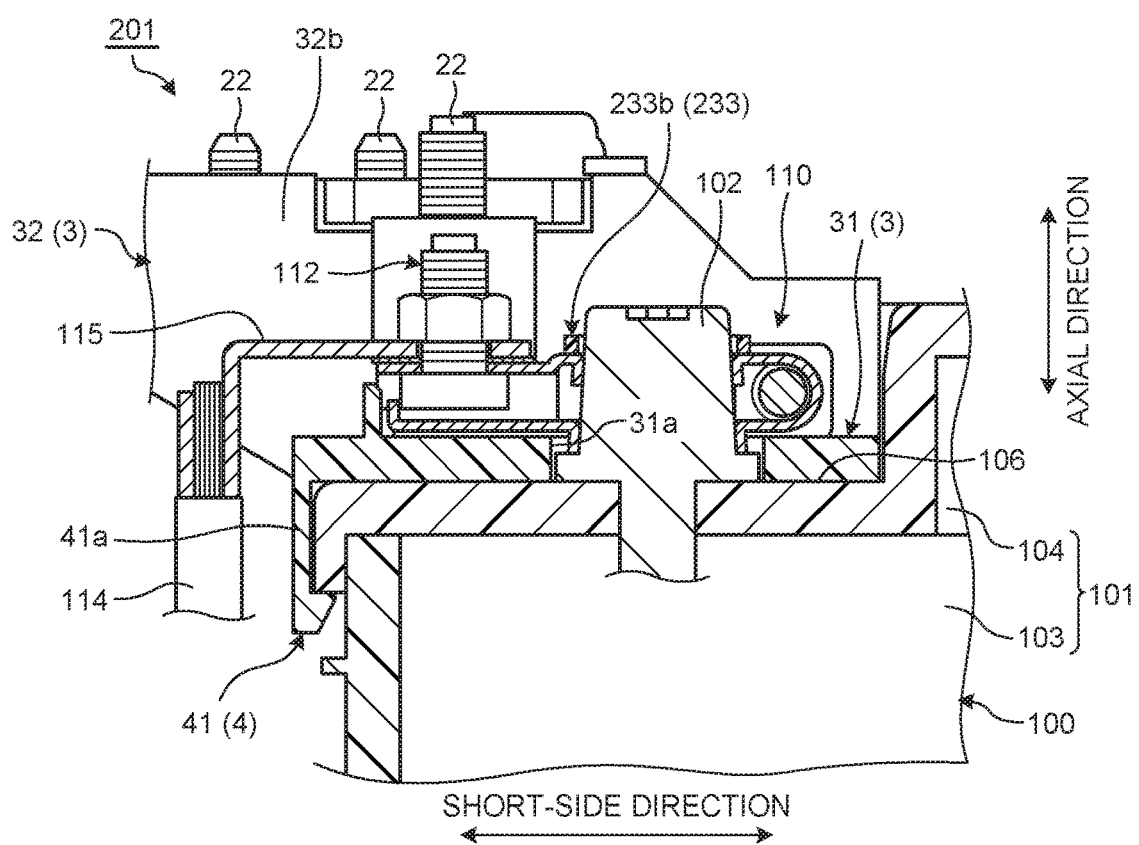
FIG. 12 is a cross-sectional view taken along line B2-B2 of FIG. 10.
Figure 13:
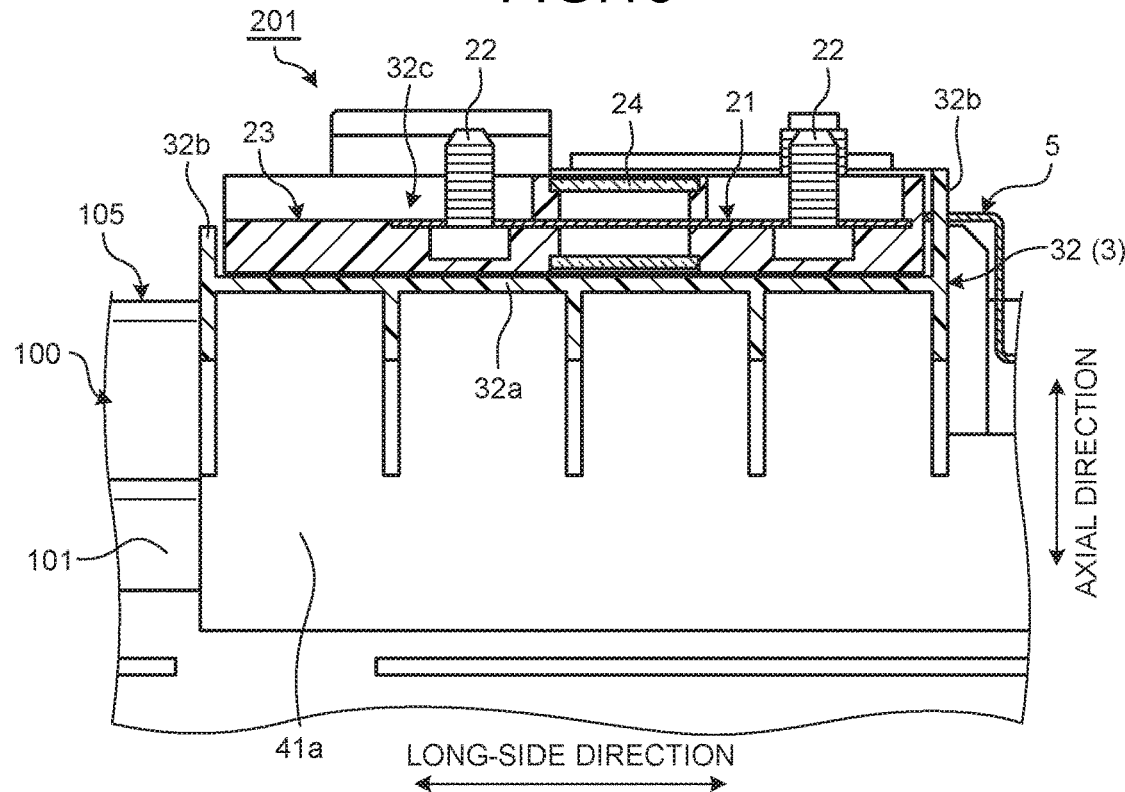
FIG. 13 is a cross-sectional view to taken along line C2-C2 of FIG. 10.
Figure 14:
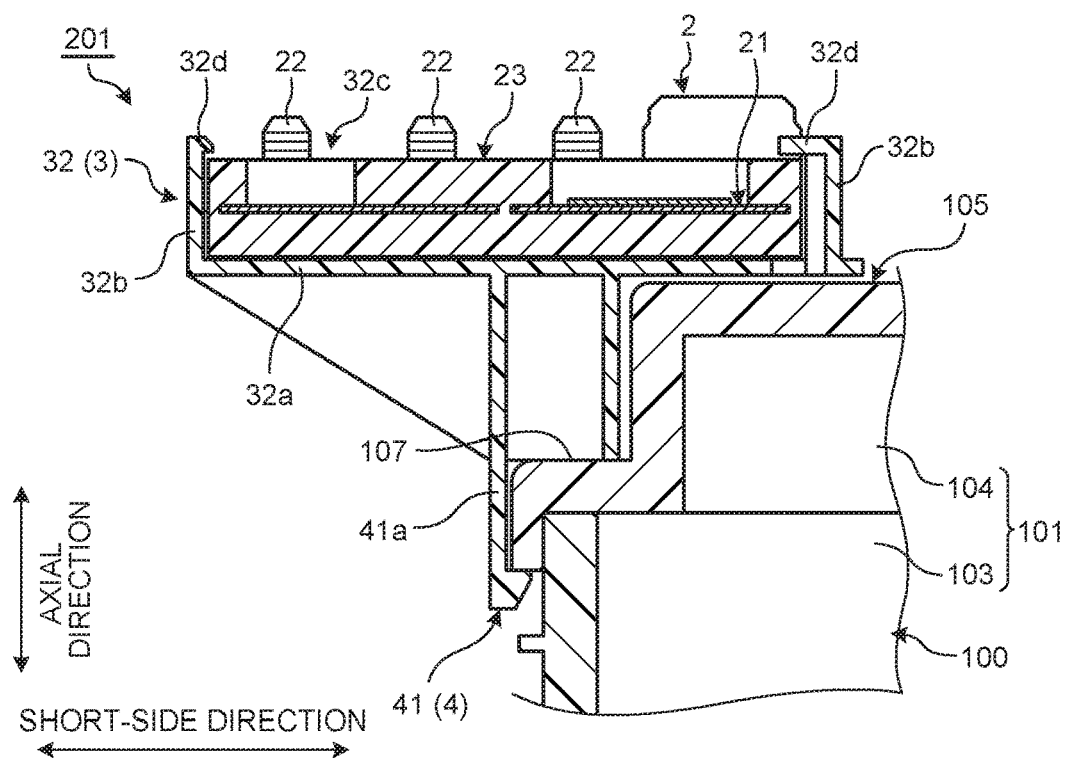
FIG. 14 is a cross-sectional view taken along line D2-D2 of FIG. 10.

FIG. 8 is a perspective view illustrating the schematic structure of a battery to which a fuse unit according to a second embodiment is applied. FIG. 9 is an exploded perspective view illustrating the schematic structure of the fuse unit according to the second embodiment. FIG. 10 is a plan view illustrating the schematic structure of the fuse unit according to the second embodiment. FIG. 11 is a cross-sectional view taken along line A2-A2 of FIG. 10. FIG. 12 is a cross-sectional view taken along line B2-B2 of FIG. 10. FIG. 13 is a cross-sectional view taken along line C2-C2 of FIG. 10. FIG. 14 is a cross-sectional view taken along line D2-D2 of FIG. 10. Meanwhile, a fuse element and stud bolts are actually embedded in a housing by insert molding, but are schematically illustrated in FIG. 9 so as to be disassembled for easy understanding of description. The fuse unit according to the second embodiment is different from the fuse unit according to the first embodiment in that the fuse unit according to the second embodiment further includes a mounting portion. The repeated description of components, action, and effects, which are common to the above-mentioned embodiment, will be omitted as much as possible.

As illustrated in FIGS. 8, 9, 10, 11, 12, 13, and 14, a fuse unit 201 according to this embodiment includes a fusible link 2, a protector 3 serving as a holding mechanism, a locking mechanism 4, and a connecting bus bar 5.

The protector 3 of this embodiment further includes a mounting portion 233 which is provided on the base portion 31 and on which the battery terminal 110 is mounted. The mounting portion 233 is to mount the battery terminal 110 on the base portion 31 at a position where the battery terminal 110 can be fastened to the battery post 102. The mounting portion 233 of this embodiment includes engagement claw portions 233a and a lid part 233b that is engaged with the engagement claw portions 233a (see FIGS. 9, 11, and the like). A pair of engagement claw portions 233a is provided on the base portion 31 with the post insertion hole 31a interposed therebetween in the long-side direction. The lid part 233b is to cover a portion of the battery terminal 110 positioned near the annular portion 111a. A through hole, which has substantially the same shape as the post insertion hole 111c of the battery terminal 110, is formed at the lid part 233b, and locking portions 233c, which can be engaged with the above-mentioned engagement claw portions 233a, are formed at the lid part 233b on both sides of the through hole (see FIG. 9 and the like). When the respective locking portions 233c of the lid part 233b are engaged with the engagement claw portions 233a provided on the base portion 31 in a state in which the battery terminal 110 is interposed between the base portion 31 and the lid part 233b, the mounting portion 233 can mount and lock the battery terminal 110 on and to the base portion 31 at a predetermined position. The respective engagement claw portions 233a and the lid part 233b of the mounting portion 233 are provided so as to satisfy a positional relationship in which the battery post 102 is inserted into the post insertion hole 111c of the battery terminal 110 in a state in which the battery post 102 is inserted into the post insertion hole 31a of the base portion 31.

When the fusible link 2 is fitted to the housing space portion 32c of the holding portion 32 of the protector 3 and the plurality of locking claw portions 32d are engaged with the housing 23 of the fusible link 2 in the fuse unit 201 having the above-mentioned structure, the fusible link 2 is locked to the housing space portion 32c. Then, the protector 3 of the fuse unit 201 is assembled on the post-standing surface 105 of the battery 100 together with the fusible link 2 in a positional relationship in which the battery post 102 is inserted into the post insertion hole 31a of the base portion 31 of the protector 3 and the post insertion hole 111c of the battery terminal 110 and the base portion 31 is positioned in the recess 106 in a state in which the battery terminal 110 is mounted on the mounting portion 233 provided on the base portion 31. At this time, when the locking claw portions 41 and 42 of the locking mechanism 4 are engaged with the lower end face of the lid member 104 in the vertical direction, the fuse unit 201 can lock the fusible link 2 and the protector 3 on the post-standing surface 105.

Since a part of at least the protector 3 of the fuse unit 201 is positioned on the post-standing surface 105 of the battery 100 in this way, the fusible link 2 can be placed and held on the post-standing surface 105. Then, the connecting bus bar 5 of the fuse unit 201 is provided so as to connect the stud bolt 22 of the power supply-side terminal 21a of the fuse element 21 to the battery terminal 110 and the bolts, nuts, and the like of the respective portions are tightened. As a result, the battery terminal 110 is fastened to the battery post 102, and the battery terminal 110 and the fusible link 2 are connected to each other.

Since the above-mentioned fuse unit 201 holds the fusible link 2 on the post-standing surface 105 of the battery housing 101 by the holding portion 32 connected to the base portion 31 of the protector 3 and receives the load of the fusible link 2 on the post-standing surface 105, a load acting on the battery terminal 110 from the fuse unit 201 can be suppressed. Accordingly, a load acting on the battery post 102 can be suppressed. Further, in a case in which a space required to install the fuse unit 201 cannot be ensured around the side surfaces of the battery housing 101, an installation space can be ensured on the post-standing surface 105 of the battery housing 101 (the upper surface of the battery housing 101 in the vertical direction) so that the fusible link 2 of the fuse unit 201 can be disposed. Therefore, the fusible link 2 can be appropriately provided.

Furthermore, according to the above-mentioned fuse unit 201, the protector 3 includes the mounting portion 233 that mounts the battery terminal 110 on the base portion 31 at a position where the battery terminal 110 can be fastened to the battery post 102. Accordingly, since the fuse unit 201 can integrally assemble the protector 3 and the battery terminal 110 to the battery 100 in a state in which the battery terminal 110 is mounted on the mounting portion 233, working man-hours at the time of assembling can be reduced. Therefore, assembling workability can be improved.

Further, since the fuse unit 201 can integrally assemble the protector 3 and the battery terminal 110 to the battery 100, the locking claw portions 41 and 42 and the plate-like portions 41a and 42a, which are formed integrally with the protector 3, can also be used as a regulating member that regulates the assembly angle of the battery terminal 110 with respect to the battery post 102. That is, since the locking claw portions 41 and 42 and the plate-like portions 41a and 42a also function as a stopper that regulates the rotation of the battery terminal 110 in the circumferential direction of the battery post 102 within a predetermined range, the fuse unit 201 can limit the allowable range of the assembly angle of the battery terminal 110 with respect to the battery post 102 to a relatively narrow range. Accordingly, the accuracy of the assembly of the battery terminal 110 to the battery post 102 can be improved.

Meanwhile, the above-mentioned mounting portion 233 is not limited to the form described above. For example, the mounting portion 233 has included two sets of pairs of engagement claw portions 233a and the locking portions 233c but the base portion 31 and the lid part 233b may be formed integrally with each other through a hinge instead of one set thereof. In this case, when the locking portion 233c engaged with the engagement claw portion 233a in a state in which the battery terminal 110 is held between the base portion 31 and the lid part 233b, that is, a closed state, the opening of the lid part 233b is regulated. Accordingly, the mounting portion 233 can mount and lock the battery terminal 110 on and to the base portion 31 at a predetermined position. Further, the mounting portion 233 may not include the lid part 233b and the like. In this case, the mounting portion 233 may be adapted to mount and lock the battery terminal 110 on and to the base portion 31 at a predetermined position when, for example, a recess, which is formed on one of the battery terminal 110 and the base portion 31, and a protruding portion, which is formed on the other thereof and has a locking shape, are fitted and locked to each other.

Third Embodiment

Figure 15:
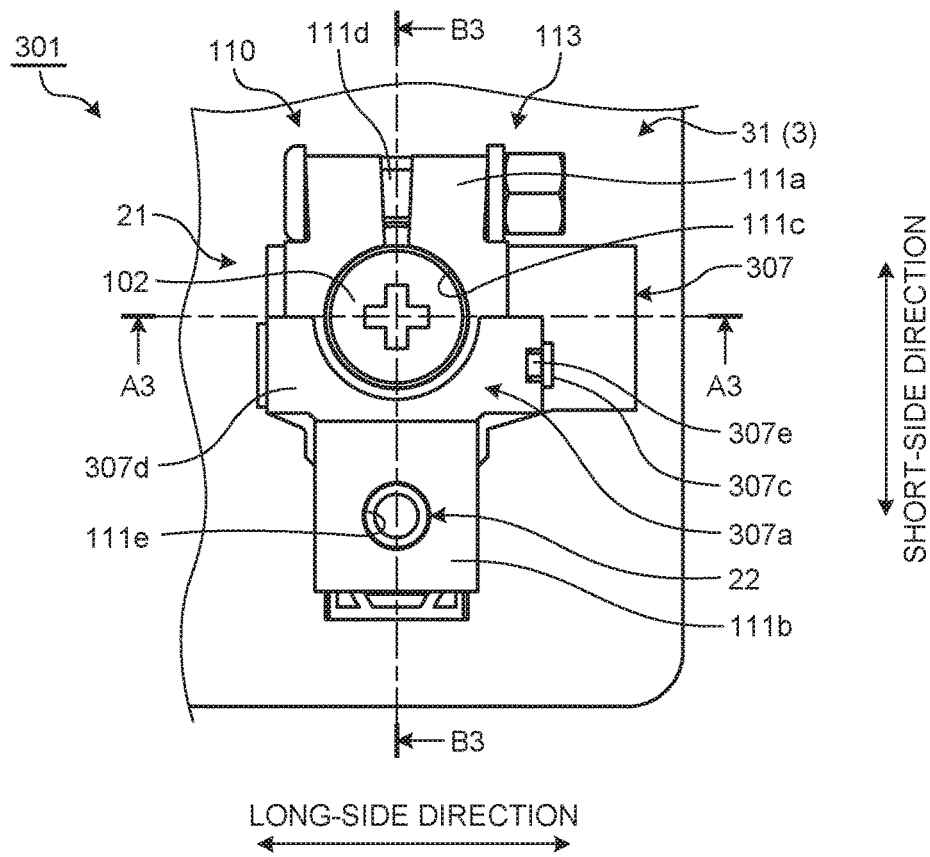
FIG. 15 is a plan view of a portion of a fuse unit according to a third embodiment near a terminal positioning mechanism.
Figure 16:
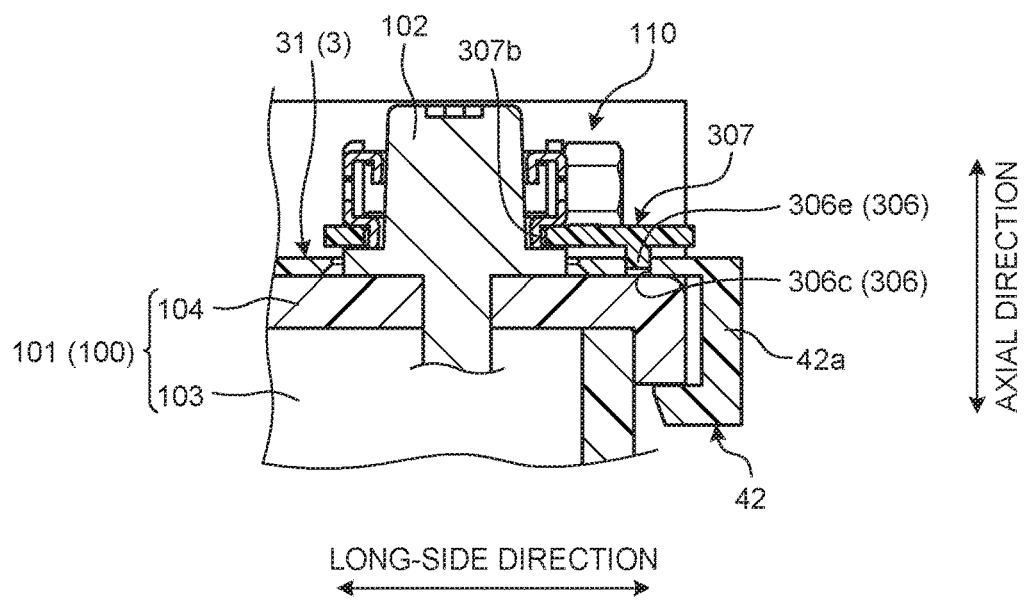
FIG. 16 is a cross-sectional view taken along line A3-A3 of FIG. 15.
Figure 17:
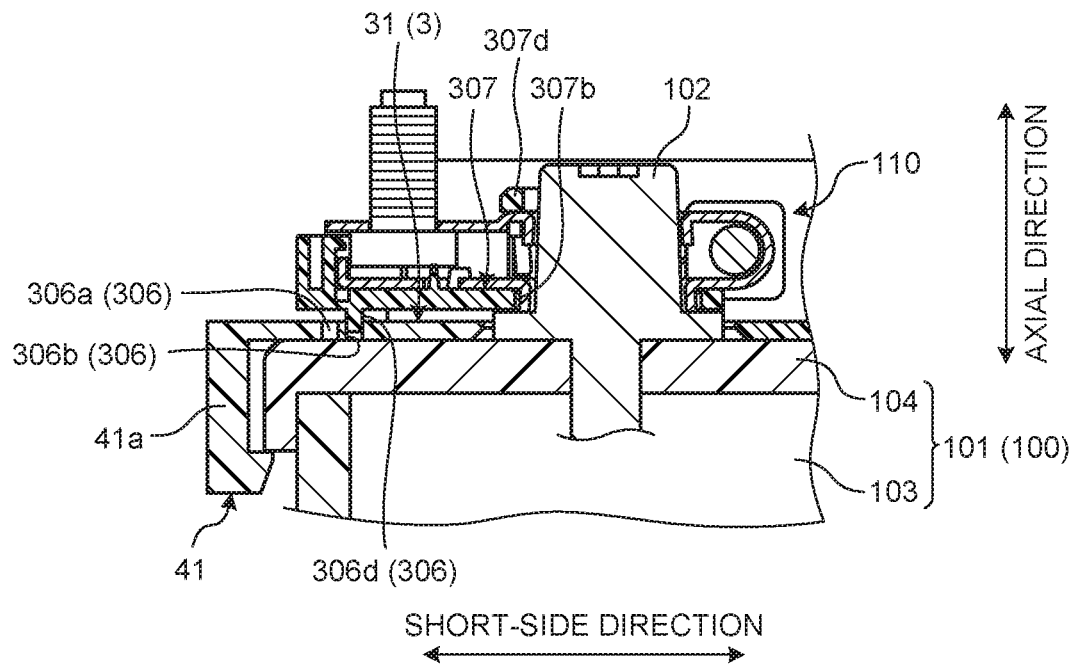
FIG. 17 is a cross-sectional view taken along line B3-B3 of FIG. 15.
Figure 18:
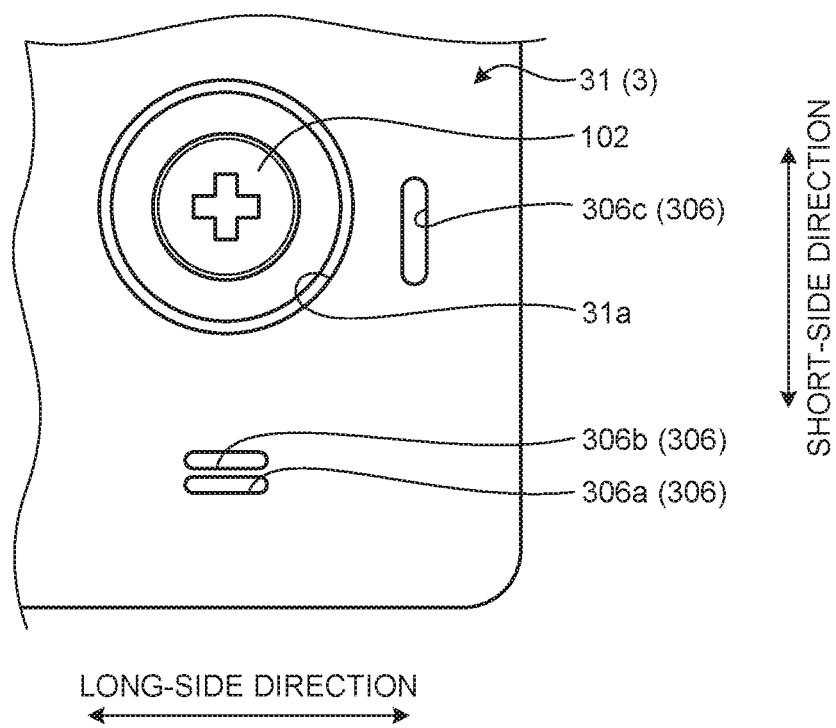
FIG. 18 is a plan view of a portion of the fuse unit according to the third embodiment near a base portion of a protector.
Figure 19:
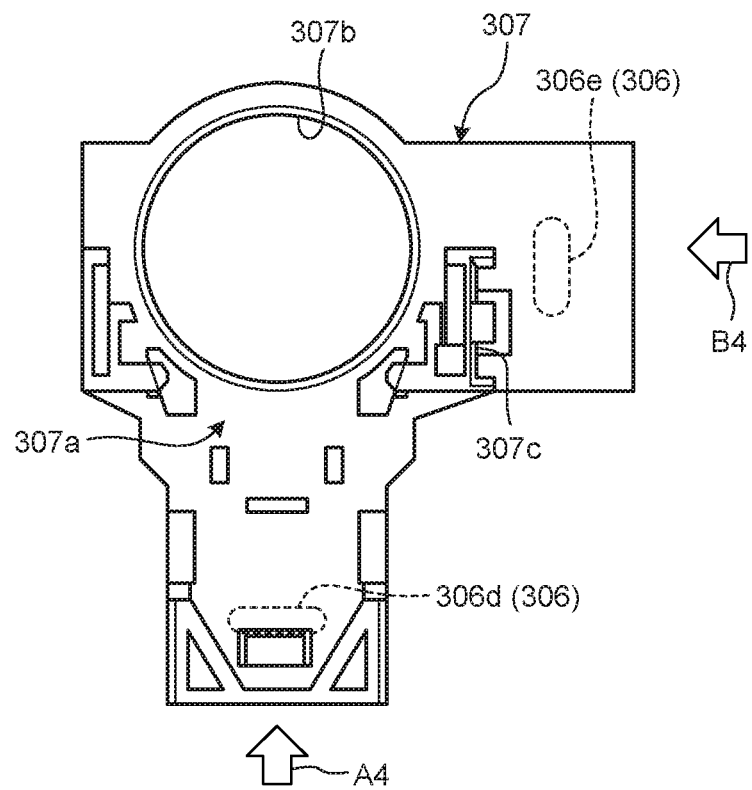
FIG. 19 is a plan view of a terminal base of the fuse unit according to the third embodiment.
Figure 20:
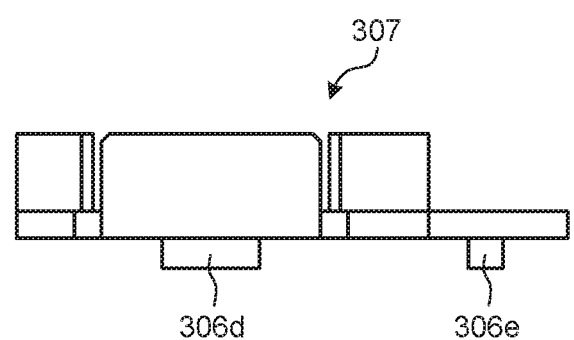
FIG. 20 is a diagram taken in the direction of an arrow A4 of FIG. 19.
Figure 21:
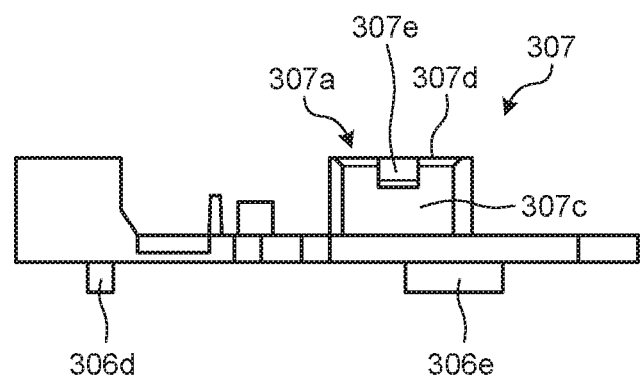
FIG. 21 is a diagram taken in the direction of an arrow B4 of FIG. 19.
Figure 22:
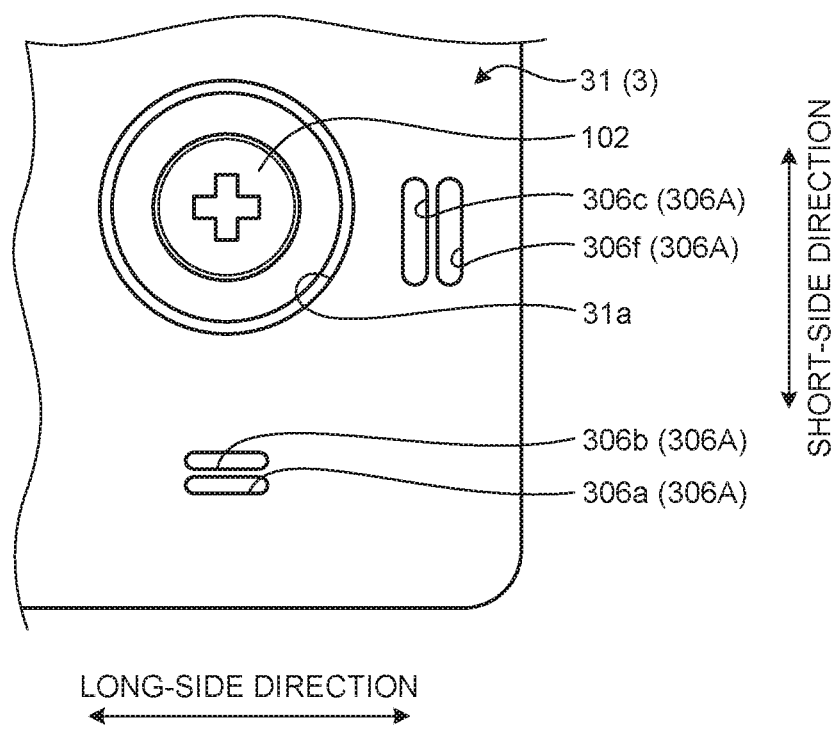
FIG. 22 is a plan view of a portion of a fuse unit according to a modification near a base portion of a protector.
Figure 23:
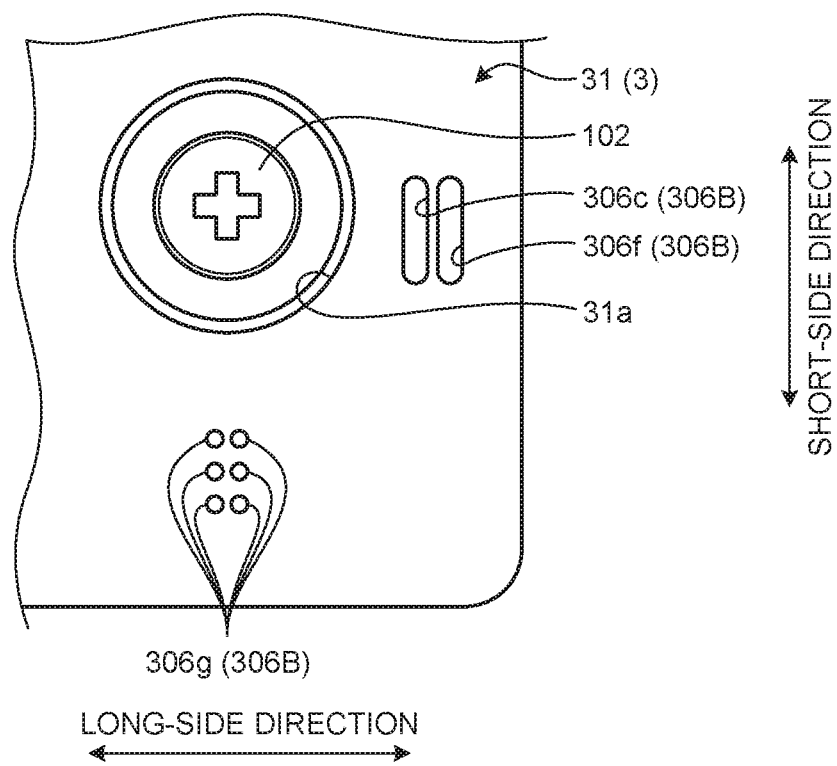
FIG. 23 is a plan view of a portion of the fuse unit according to the modification near the base portion of the protector.

FIG. 15 is a plan view of a portion of a fuse unit according to a third embodiment near a terminal positioning mechanism. FIG. 16 is a cross-sectional view taken along line A3-A3 of FIG. 15. FIG. 17 is a cross-sectional view taken along line B3-B3 of FIG. 15. FIG. 18 is a plan view of a portion of the fuse unit according to the third embodiment near a base portion of a protector. FIG. 19 is a plan view of a terminal base of the fuse unit according to the third embodiment. FIG. 20 is a diagram taken in the direction of an arrow A4 of FIG. 19. FIG. 21 is a diagram taken in the direction of an arrow B4 of FIG. 19. FIG. 22 is a plan view of a portion of a fuse unit according to a modification near a base portion of a protector. FIG. 23 is a plan view of a portion of the fuse unit according to the modification near the base portion of the protector. Meanwhile, the fuse unit according to the third embodiment is different from the fuse unit according to the first embodiment in that the fuse unit according to the third embodiment further includes a terminal positioning mechanism. The repeated description of components, action, and effects, which are common to the above-mentioned embodiment, will be omitted as much as possible, and the schematic structure of the fuse unit will appropriately refer to the other drawings.

As illustrated in FIGS. 15, 16, 17, 18, 19, 20, and 21, a fuse unit 301 according to this embodiment further includes a terminal positioning mechanism 306 in addition to the fusible link 2 (see FIG. 1 and the like), the protector 3 (see FIG. 1 and the like) serving as a holding mechanism, the locking mechanism 4 (see FIG. 1 and the like), and the connecting bus bar 5 (see FIG. 1 and the like) that have been described above. Meanwhile, the fuse unit 301 according to this embodiment does not require, for example, protrusions that are illustrated in FIG. 2 and the like and are formed on the base portion 31.

The terminal positioning mechanism 306 is to position the battery terminal 110 at a predetermined position on the base portion 31 of the protector 3. The terminal positioning mechanism 306 includes a plurality of recesses 306a, 306b, and 305c (see FIG. 18 and the like) that are provided on one of a side of the battery terminal 110 and a side of the base portion 31, and protrusions 306d and 306e (see FIGS. 20, 21, and the like) that are provided on the other of the side of the battery terminal 110 and the side of the base portion 31 and are fitted to any of the plurality of recesses 306a, 306b, and 306c. Here, the plurality of recesses 306a, 306b, and 306c are provided on the base portion 31, and the protrusions 306d and 306e are provided on a terminal base 307 that is integrally assembled to the battery terminal 110. The terminal positioning mechanism 306 positions the battery terminal 110 on the base portion 31 at a position where the battery terminal 110 can be fastened to the battery post 102.

As illustrated in FIGS. 16, 17, and 18, the plurality of recesses 306a, 306b, and 306c are provided on the base portion 31 to position the battery terminal 110 at a predetermined position on the base portion 31. Here, the plurality of recesses 306a, 306b, and 306c are hole portions passing through the base portion 31, but may be bottomed groove portions (hole portions) without being limited thereto.

Among the plurality of recesses 306a, 306b, and 306c, the recesses 306a and 306b are recesses that are used to position the battery terminal 110 on the base portion 31 in the short-side direction. Here, the recesses 306a and 306b are formed in an elliptical shape along the long-side direction, and are provided so as to be arranged with a predetermined interval interposed therebetween in the short-side direction. An interval between the recesses 306a and 306b in the short-side direction may be set according to tolerance and the like allowed for the battery 100 and the like and is set so as to be capable of coping with, for example, the positional deviation of the battery post 102 in the short-side direction that is caused by tolerance. Meanwhile, the two recesses 306a and 306b have been described here as the recesses that are used to position the battery terminal 110 on the base portion 31 in the short-side direction, but more recesses may be provided to cope with the positional deviation of the battery post 102 in the short-side direction that is caused by tolerance.

Among the plurality of recesses 306a, 306b, and 306c, the recess 306c is a recess that is used to position the battery terminal 110 on the base portion 31 in the long-side direction. Here, the recess 306c is formed in an elliptical shape along the short-side direction. As in the case of the interval between the above-mentioned recesses 306a and 306b in the short-side direction, the length of the recess 306c in the short-side direction may be set according to tolerance and the like allowed for the battery 100 and the like and is set so as to be capable of coping with, for example, the positional deviation of the battery post 102 in the short-side direction that is caused by tolerance.

As illustrated in FIGS. 16, 17, 19, 20, and 21, the protrusions 306d and 306e are provided on the terminal base 307 to position the battery terminal 110 at a predetermined position on the base portion 31.

Here, the terminal base 307 is a plate-like member that is integrally assembled to the battery terminal 110, and is interposed between the battery terminal 110 and the base portion 31 of the protector 3. The terminal base 307 includes an assembly portion 307a to which the battery terminal 110 is assembled, and a post insertion hole 307b that is formed at a position facing the post insertion hole 111c in a state in which the battery terminal 110 is integrally assembled to the assembly portion 307a. For example, the assembly portion 307a includes an engagement claw portion 307c (see FIG. 19 and the like) and a lid part 307d (see FIG. 15 and the like) that is engaged with the engagement claw portion 307c. The engagement claw portion 307c is provided on a plate-like member that forms the terminal base 307. The lid part 307d is to cover a portion of the battery terminal 110 positioned near the annular portion 111a. A semicircular notched portion, which has substantially the same curvature as the post insertion hole 111c of the battery terminal 110, is formed at the lid part 307d; one side portion of the notched portion is connected to the plate-like member, which forms the terminal base 307, through a hinge or the like; and a locking portion 307e (see FIGS. 15, 21, and the like), which can be engaged with the engagement claw portion 307c, is formed at the other side portion of the notched portion. When the locking portion 307e of the lid part 307d is engaged with the engagement claw portion 307c in a state in which the battery terminal 110 is interposed between the plate-like member forming the terminal base 307 and the lid part 307d, the assembly portion 307a integrally assembles the terminal base 307 to the battery terminal 110. The post insertion hole 307b is formed in the plate-like member, which forms the terminal base 307, at a position facing the post insertion hole 111c so as to have the same size and shape as the post insertion hole 111c in a state in which the battery terminal 110 is integrally assembled to the assembly portion. 307a. Further, the notched portion of the above-mentioned lid part 307d also faces the post insertion hole 111c in this state.

Furthermore, the protrusions 306d and 306e of this embodiment are formed so as to protrude from the surface of the terminal base 307 opposite to the surface of the terminal base 307 on which the battery terminal 110 is provided (see FIGS. 20, 21, and the like). The protrusion 306d of the protrusions 306d and 306e is a protrusion that is used to position the battery terminal 110 on the base portion 31 in the short-side direction. Here, the protrusion 306d is formed as a protruding portion of which the cross-sectional shape is an elliptical shape along the long-side direction, and is formed so as to have a size and a shape that allow the protrusion 306d to be fitted to the above-mentioned recesses 306a and 306b. The protrusion 306e of the protrusions 306d and 306e is a protrusion that is used to position the battery terminal 110 on the base portion 31 in the long-side direction. Here, the protrusion 306e is formed as a protruding portion of which the cross-sectional shape is an elliptical shape along the short-side direction, and is formed so as to have a size and a shape that allow the protrusion 306e to be fitted to the above-mentioned recess 306c and allow the protrusion 306e to be movable in the short-side direction in a state in which the protrusion 306e is fitted to the recess 306c. Here, as in the cases of the length of the above-mentioned recess 306c in the short-side direction and the interval between the recesses 306a and 306b in the short-side direction, a distance in which the protrusion 306e can move in the short-side direction may be set according to tolerance and the like allowed for the battery 100 and the like and is set so as to be capable of coping with, for example, the positional deviation of the battery post 102 in the short-side direction that is caused by tolerance.

The recesses 306a, 306b, and 306c and the protrusions 306d and 306e of the terminal positioning mechanism 306 having the above-mentioned structure are provided so as to satisfy a positional relationship in which the battery post 102 is inserted into the post insertion hole 111*c* of the battery terminal 110 in a state in which the battery post 102 is inserted into the post insertion hole 31*a* of the base portion 31. As a result, when the protrusion 306*d* is fitted to any one of the recesses 306*a* and 306*b* (see FIG. 17) and the protrusion 306*e* is fitted to the recess 306*c* (see FIG. 16), the terminal positioning mechanism 306 can position the battery terminal 110 at an appropriate position on the base portion 31, that is, a position where the battery post 102 can be inserted into the post insertion hole 31*a* of the base portion 31 and the post insertion hole 111*c* of the battery terminal 110.

At this time, when the protrusion 306*d* is selectively fitted to any one of the recesses 306*a* and 306*b*, the terminal positioning mechanism 306 can position the battery terminal 110 at an appropriate position on the base portion 31 in response to the positional deviation of the battery post 102 in the short-side direction that is caused by tolerance and the like allowed for the battery 100 and the like. In other words, the terminal positioning mechanism 306 can position the battery terminal 110 at an appropriate position on the base portion 31 while allowing the positional deviation of the battery post 102 in the short-side direction. Furthermore, in other words, while allowing the positional deviation of the battery post 102 in the short-side direction, the terminal positioning mechanism 306 can appropriately change the position of the battery terminal 110 on the base portion 31 to an appropriate position in accordance with the positional deviation. Meanwhile, in this case, the above-mentioned protrusion 306*e* is adapted to be movable in the short-side direction in a state in which the protrusion 306*e* is fitted to the recess 306*c*. Accordingly, the protrusion 306*e* does not hinder the relative displacement (in other words, the adjustment of the positions) of the battery terminal 110 and the base portion 31 in the short-side direction even though the protrusion 306*d* is fitted to any one of the recesses 306*a* and 306*b*.

Since the above-mentioned fuse unit 301 holds the fusible link 2 on the post-standing surface 105 of the battery housing 101 by the holding portion 32 connected to the base portion 31 of the protector 3 and receives the load of the fusible link 2 on the post-standing surface 105, a load acting on the battery terminal 110 from the fuse unit 301 can be suppressed. Accordingly, a load acting on the battery post 102 can be suppressed. Further, in a case in which a space required to install the fuse unit 301 cannot be ensured around the side surfaces of the battery housing 101, an installation space can be ensured on the post-standing surface 105 of the battery housing 101 (the upper surface of the battery housing 101 in the vertical direction) so that the fusible link 2 of the fuse unit 301 can be disposed. Therefore, the fusible link 2 can be appropriately provided.

Furthermore, the above-mentioned fuse unit 301 includes the terminal positioning mechanism 306 that includes the plurality of recesses 306*a*, 306*b*, and 306*c* provided on one of the battery terminal 110 and the base portion 31 and the protrusions 306*d* and 306*e* provided on the other of the battery terminal 110 and the base portion 31 and fitted to any of the plurality of recesses 306*a*, 306*b*, and 306*c*, and position the battery terminal 110 on the base portion 31 at a position where the battery terminal 110 can be fastened to the battery post 102. Accordingly, the terminal positioning mechanism 306 can position the battery terminal 110 at an appropriate position on the base portion 31, that is, a position where the battery terminal 110 can be fastened to the battery post 102 when the protrusions 306*d* and 306*e* are fitted to any of the recesses 306*a*, 306*b*, and 306*c*. Further, at this time, when the recesses 306*a*, 306*b*, and 306*c* to which the protrusions 306*d* and 306*e* are to be fitted are appropriately selected, the terminal positioning mechanism 306 can position the battery terminal 110 by finely adjusting the battery terminal 110 at an appropriate position on the base portion 31 in response to the positional deviation of the battery post 102 that is caused by tolerance and the like allowed for the battery 100 and the like.

Meanwhile, since at least the recesses 306*a* and 306*b* are provided so as to be arranged in the short-side direction, the above-mentioned terminal positioning mechanism 306 is adapted so as to be capable of coping with the positional deviation of the battery post 102 in the short-side direction that is caused by tolerance and the like. However, the terminal positioning mechanism 306 may also be adapted to be capable of coping with the positional deviation of the battery post 102 in the long-side direction.

As illustrated in FIG. 22, a terminal positioning mechanism 306A according to a modification further includes a recess 306*f*, which is provided so as to be arranged with a predetermined interval between itself and the recess 306*c* in the long-side direction, in addition to the structure of the above-mentioned terminal positioning mechanism 306. The recess 306*f* is formed so as to have the same size and shape as the recess 306*c*. An interval between the recesses 306*c* and 306*f* in the long-side direction may be set according to tolerance and the like allowed for the battery 100 and the like and is set so as to be capable of coping with, for example, the positional deviation of the battery post 102 in the long-side direction that is caused by tolerance. Further, in this case, the protrusion 306*d* is formed so as to have a size and a shape that allow the protrusion 306*d* to be fitted to the recesses 306*a* and 306*b* and allow the protrusion 306*d* to be movable in the long-side direction in a state in which the protrusion 306*d* is fitted to the recess 306*a* or 306*b*. Accordingly, the protrusion 306*d* is adapted not to hinder the relative displacement (in other words, the adjustment of the positions) of the battery terminal 110 and the base portion 31 in the long-side direction.

In this case, the terminal positioning mechanism 306A can also position the battery terminal 110 at an appropriate position on the base portion 31 in response to the positional deviation of the battery post 102 in the long-side direction when the protrusion 306*e* is selectively fitted to any one of the recesses 306*c* and 306*f*, in addition to the positional deviation of the battery post 102 in the short-side direction that is caused by tolerance and the like allowed for the battery 100 and the like. In other words, the terminal positioning mechanism 306A can position the battery terminal 110 at an appropriate position on the base portion 31 while further allowing the positional deviation of the battery post 102 in the long-side direction. Furthermore, in other words, while allowing the positional deviation of the battery post 102 in the long-side direction, the terminal positioning mechanism 306A can appropriately change the position of the battery terminal 110 on the base portion 31 to an appropriate position in accordance with the positional deviation.

Moreover, the above-mentioned terminal positioning mechanisms 306 and 306A may achieve a structure, which can cope with the positional deviation of the battery post 102, and a structure, which does not hinder the relative displacement (in other words, the adjustment of the positions) of the battery terminal 110 and the base portion 31, by other structures.

As illustrated in FIG. 23, a terminal positioning mechanism 306B according to a modification includes a plurality of recesses 306g instead of the recesses 306a and 306b of the above-mentioned terminal positioning mechanism 306A. Here, the plurality of recesses 306g are formed in the shape of a perfect circle and are provided so as to be arranged in the form of a lattice at predetermined intervals in the long-side direction and the short-side direction. Here, the plurality of recesses 306g are arranged so as to form three lines in the short-side direction and two columns in the long-side direction, that is, a total of six recesses 306g are provided. Intervals between the plurality of recesses 306g may be set according to tolerance and the like allowed for the battery 100 and the like and is set so as to be capable of coping with, for example, the positional deviation of the battery post 102 in the long-side direction and the short-side direction that is caused by tolerance. In this case, the protrusion 306d to be fitted to the plurality of recesses 306g is formed in a substantially columnar shape in accordance with the shape of the recess 306g.

In this case, the terminal positioning mechanism 306B can position the battery terminal 110 at an appropriate position on the base portion 31 in response to the positional deviation of the battery post 102 in the long-side direction and the short-side direction, which is caused by tolerance and the like allowed for the battery 100 and the like, when the protrusion 306e is selectively fitted to any one of the recesses 306c and 306f and the protrusion 306d is selectively fitted to any one of the plurality of recesses 306g. At this time, according to the terminal positioning mechanism 306B, the protrusion 306d is fitted to any one of the recesses 306g of the left column in FIG. 23 among the plurality of recesses 306g when the protrusion 306e is fitted to the recess 306c, and the protrusion 306d is fitted to any one of the recesses 306g of the right column in FIG. 23 among the plurality of recesses 306g when protrusion 306e is fitted to the recess 306f. As a result, the terminal positioning mechanism 306B can achieve a structure that can cope with the positional deviation of the battery post 102, and a structure that does not hinder the relative displacement (in other words, the adjustment of the positions) of the battery terminal 110 and the base portion 31. Meanwhile, the terminal positioning mechanism 306B is the same as the above-mentioned terminal positioning mechanism 306A in terms of the structure that does not hinder the relative displacement (in other words, the adjustment of the positions) of the battery terminal 110 and the base portion 31 in the short-side direction, but the recesses 306c and 306f can also be substituted with the same components as the plurality of recesses 306g.

Meanwhile, the plurality of recesses 306a, 306b, and 306c have been provided on the base portion 31 and the protrusions 306d and 306e have been prodded on the terminal base 307 in the above description. However, the plurality of recesses 306a, 306b, and 306c may be provided on the terminal base 307 and the protrusions 306d and 306e may be provided on the base portion 31.

Further, the protrusions 306d and 306e have been provided on the terminal base 307 to be integrally assembled to the battery terminal 110 in the above description, but may be directly provided on the battery terminal 110 without the terminal base 307.

Furthermore, the above-mentioned terminal positioning mechanisms 306, 306A, and 306B may be applied to the above-mentioned fuse unit 201. In this case, the mounting portion 233 may be adapted, to mount and lock the battery terminal 110 on and to the base portion 31 at a predetermined position when, for example, a recess, which is formed on one of the battery terminal 110 and the base portion 31, and a protruding portion, which is formed on the other thereof and has a locking shape, are fitted and locked to each other; and a plurality of the recesses may be provided and also be used as the recess of the terminal positioning mechanism, and the protruding portion having a locking shape may also be used as the protrusion of the terminal positioning mechanism. In this case, since the fuse unit 201 can position the battery terminal 110 on the base portion 31 after finely adjusting the positional relationship of the battery terminal 110 relative to the base portion 31 in accordance with, for example, the shape of the battery terminal 110, the position of the battery post 102, and the like, versatility can be improved.

Fourth Embodiment

Figure 24:
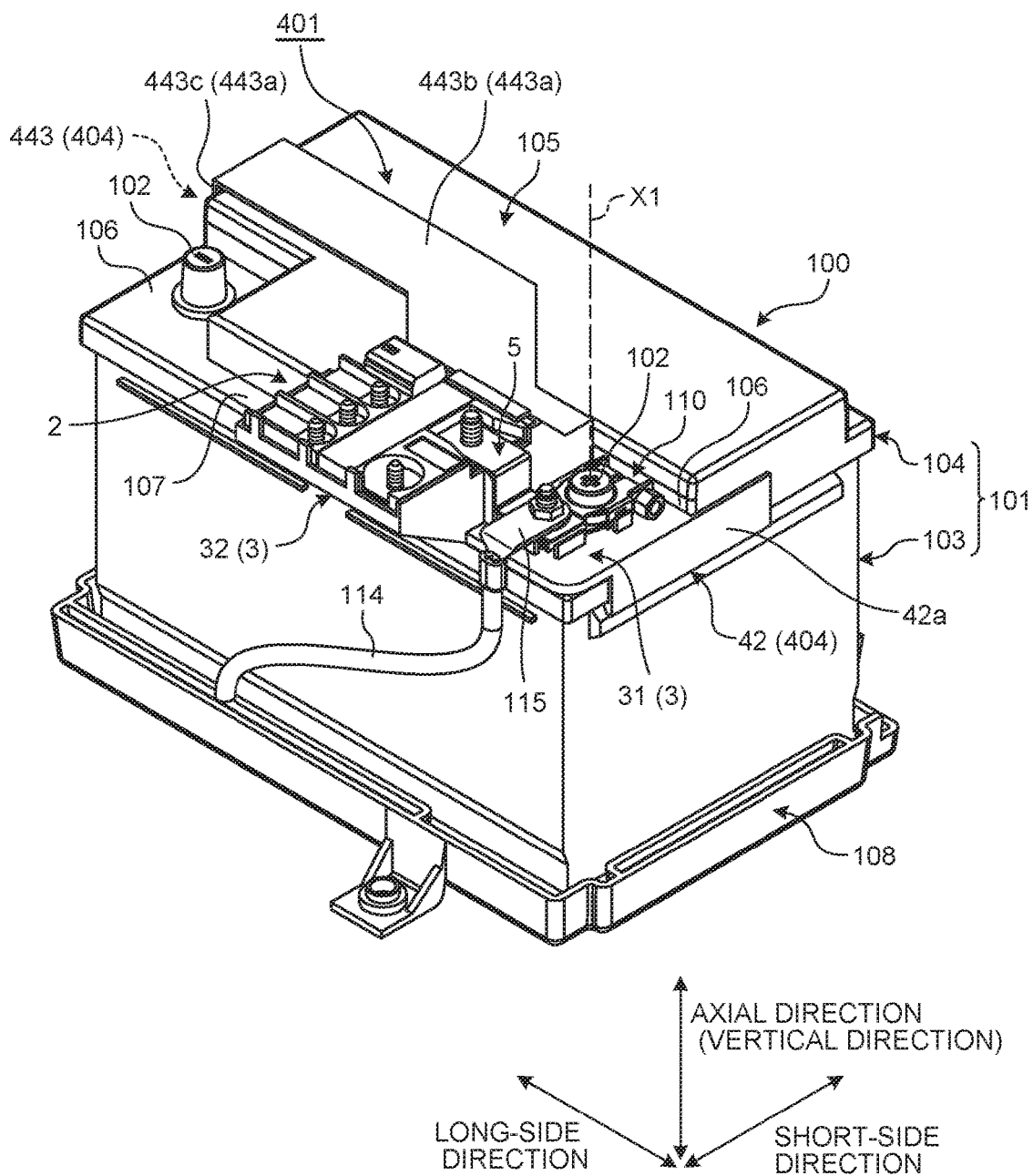
FIG. 24 is a perspective view illustrating the schematic structure of a battery to which a fuse unit according to a fourth embodiment is applied.
Figure 25:
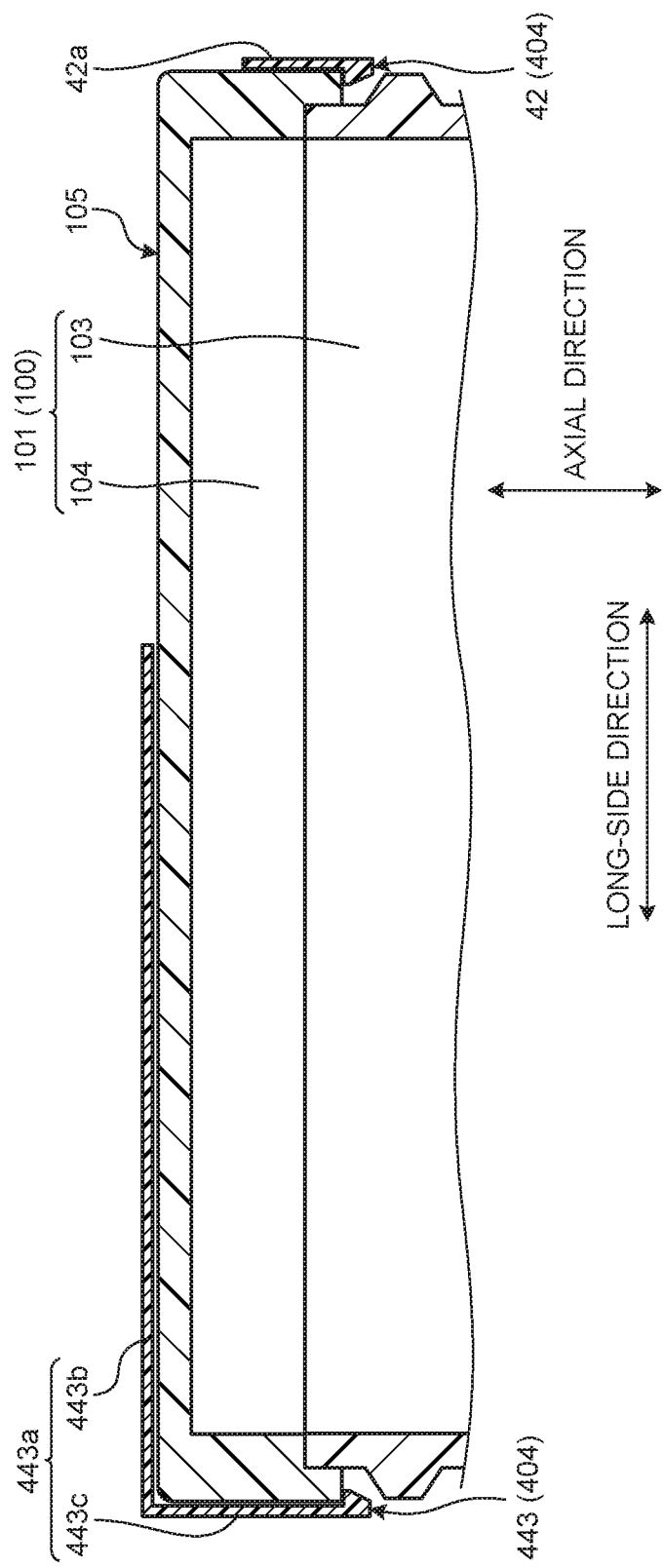
FIG. 25 is a cross-sectional view of a portion, which includes an engagement claw portion, of the fuse unit according to the fourth embodiment.
Figure 26:
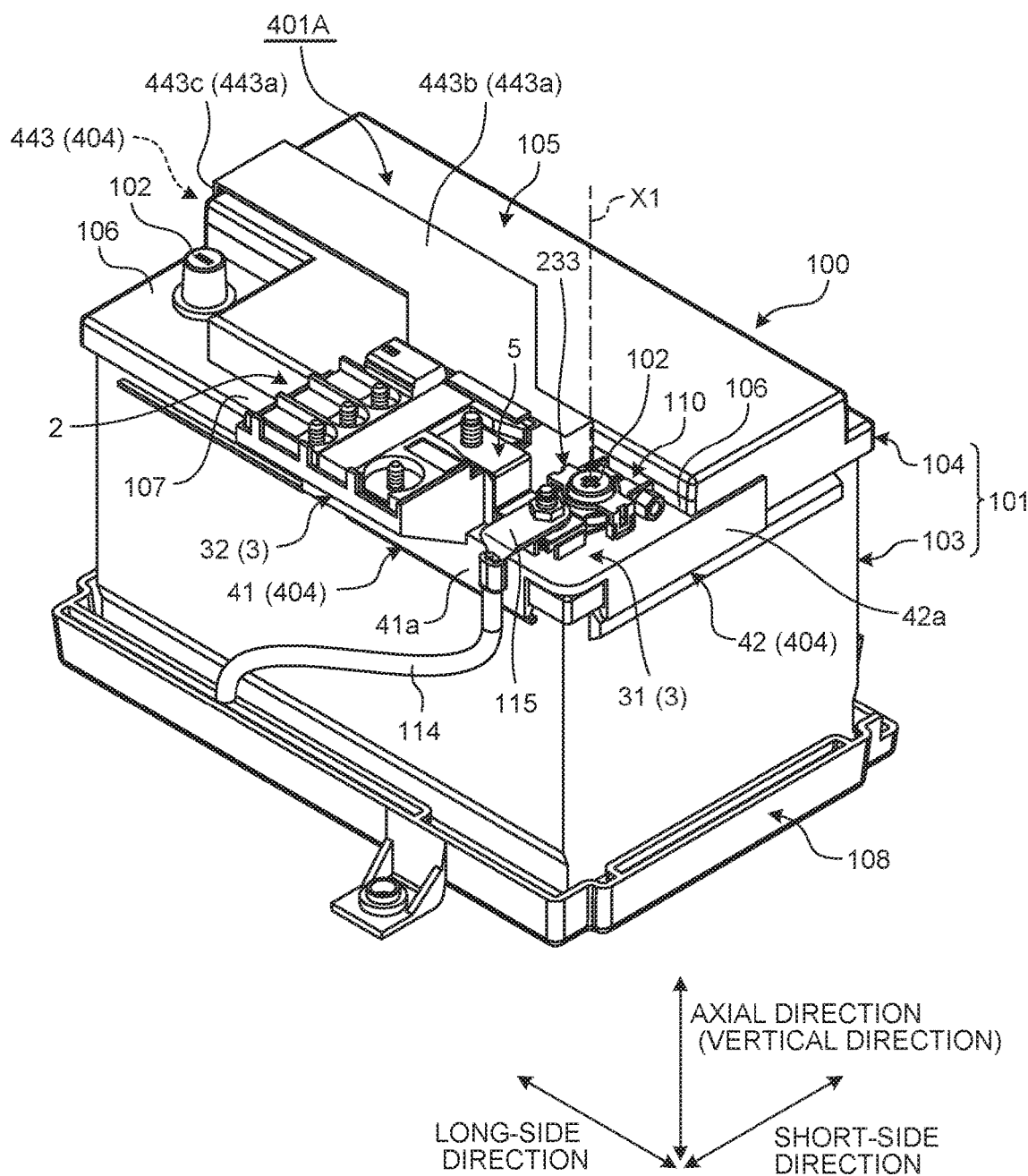
FIG. 26 is a perspective view illustrating the schematic structure of a battery to which a fuse unit according to a modification is applied.

FIG. 24 is a perspective view illustrating the schematic structure of a battery to which a fuse unit according to a fourth embodiment is applied. FIG. 25 is a cross-sectional view of a portion, which includes an engagement claw portion, of the fuse unit according to the fourth embodiment. FIG. 26 is a perspective view illustrating the schematic structure of a battery to which a fuse unit according to a modification is applied. The fuse unit according to the fourth embodiment is different from the fuse unit according to the first embodiment in terms of a position at which an engagement claw portion of a locking mechanism is provided. The repeated description of components, action, and effects, which are common to the above-mentioned embodiments, will be omitted as much as possible, and the schematic structure of the fuse unit will appropriately refer to the other drawings.

As illustrated in FIGS. 24 and 25, a fuse unit 401 according to this embodiment includes the above-mentioned fusible link. 2, the protector 3 serving as a holding mechanism, a locking mechanism 404, and the connecting bus bar 5.

Further, the locking mechanism 404 is to lock the protector 3 on the post-standing surface 105. The locking mechanism 404 of this embodiment includes locking claw portions 42 and 443 that lock the protector 3 on the post-standing surface 105 by being engaged with the battery housing 101. That is, the locking mechanism 404 of this embodiment includes the locking claw portion 443 instead of the above-mentioned locking claw portion 41. A plurality of locking claw portions 42 and 443, here, two locking claw portions are provided and are engaged with a plurality of surfaces of the battery housing 101, here, two surfaces of the battery housing 101 facing each other.

The locking claw portion 42 is formed integrally with the base portion 31 of the protector 3 through a plate-like portion 42a extending in the vertical direction in the assembled state as described above.

Meanwhile, the locking claw portion 443 is formed integrally with the base portion 31 and the holding portion 32 of the protector 3 through a support plate 443a extending in the long-side direction in the assembled state. The support plate 443a includes a body portion 443b that extends in the long-side direction from the base portion 31 and the holding portion 32 in the assembled state, and a bent portion 443c that extends downward in the vertical direction from an end portion of the body portion 443b opposite to an end portion of the body portion 443b close to the protector 3 (the base portion 31 and the holding portion 32). The locking claw portion 443 is formed integrally with the bent portion 443c at an end portion (the lower end portion in the vertical direction in a state in which the protector 3 is assembled on the post-standing surface 105 of the battery 100) of the bent portion 443c of the support plate 443a. The locking claw portion 443 is formed in a hook shape in which the end portion of the bent portion 443c is bent (see FIG. 25 and the like).

The locking claw portion 443 and the bent portion 443c of the support plate 443a are formed at a position facing the side surface of the battery housing 101 along the short-side direction of the lid member 104 in the assembled state, here, the side surface that faces the surface of the battery housing 101, with which the locking claw portion 42 is to be engaged, in the long-side direction. The locking claw portion 443 and the bent portion 443c of the support plate 443a are formed so as to extend in the short side direction in the assembled state.

Here, the locking claw portions 42 and 443 are engaged with the lower end faces of the edge portions of the lid member 104 of the battery housing 101 in the vertical direction. When the locking claw portions 42 and 443 are engaged with the lower end face of the lid member 104 in the vertical direction at predetermined positions in a state in which the protector 3 is assembled on the post-standing surface 105 of the battery 100, the locking mechanism 404 can lock the protector 3 on the post-standing surface 105.

Since the above-mentioned fuse unit 401 holds the fusible link 2 on the post-standing surface 105 of the battery housing 101 by the holding portion 32 connected to the base portion 31 of the protector 3 and receives the load of the fusible link 2 on the post-standing surface 105, a load acting on the battery terminal 110 from the fuse unit 401 can be suppressed. Accordingly, a load acting on the battery post 102 can be suppressed. Further, in a case in which a space required to install the fuse unit 401 cannot be ensured around the side surfaces of the battery housing 101, an installation space can be ensured on the post-standing surface 105 of the battery housing 101 (the upper surface of the battery housing 101 in the vertical direction so that the fusible link 2 of the fuse unit 401 can be disposed. Therefore, the fusible link 2 can be appropriately provided.

Furthermore, the above-mentioned fuse unit 401 can reliably assemble the protector 3 and the fusible link 2 on the post-standing surface 105 by the locking mechanism 404.

In addition, when the locking claw portions 42 and 443 are engaged with the battery housing 101, the above-mentioned fuse unit 401 can lock the protector 3 and the fusible link 2 on the post-standing surface 105.

Moreover, according to the above-mentioned fuse unit 401, a plurality of locking claw portions 42 and 443 are provided and are engaged with two surfaces of the battery housing 101 facing each other. Accordingly, since the locking claw portions 42 and 443 are engaged with the two surfaces of the battery housing 101 facing each other and can lock the protector 3 on the post-standing surface 105, the fuse unit 401 can more reliably assemble the protector 3 on the post-standing surface 105.

Meanwhile, as illustrated in a modification exemplified in FIG. 26, the above-mentioned locking mechanism 404 may be applied to the above-mentioned fuse unit 201 so as to form a fuse unit 401A. Even in this case, when the locking claw portions 42 and 443 are engaged with the battery housing 101, the fuse unit 401A can lock the protector 3 and the fusible link 2 on the post-standing surface 105. Accordingly, the fuse unit 401A can reliably assemble the protector 3 and the fusible link 2 on the post-standing surface 105. Meanwhile, the locking mechanism 404 according to the modification illustrated in FIG. 26 further includes the above-mentioned locking claw portion 41 in addition to the locking claw portions 42 and 443. In this case, the locking claw portions 41, 42, and 443 are engaged with three surfaces of the battery housing 101. In this case, since the fuse unit 401A also can suppress the bending and the like of the support plate 443a due to, for example, the presence of the locking claw portion 41, the fuse unit 401A can more reliably lock the protector 3 on the post-standing surface 105.

Fifth Embodiment

Figure 27:
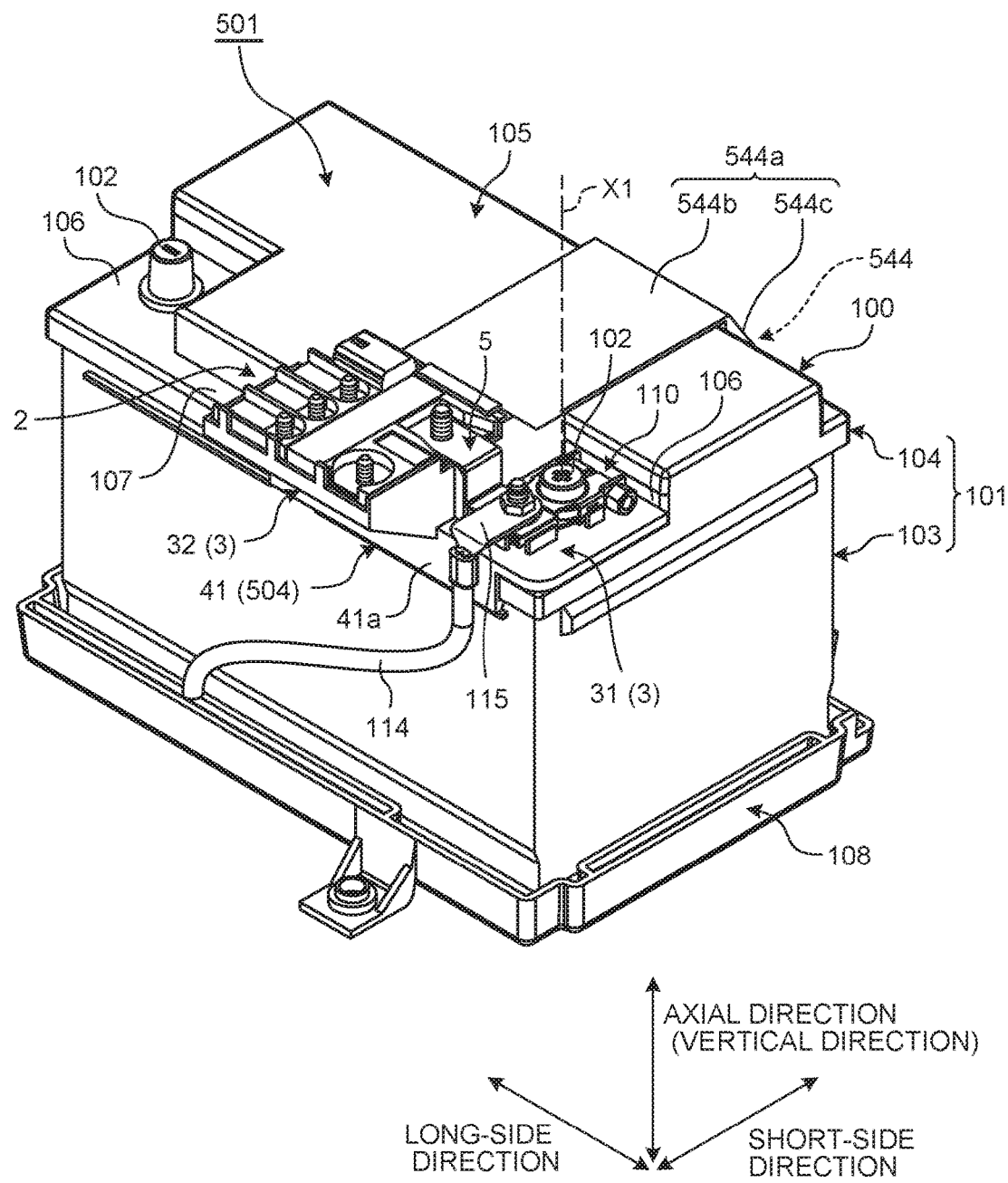
FIG. 27 is a perspective view illustrating the schematic structure of a battery to which a fuse unit according to a fifth embodiment is applied.
Figure 28:
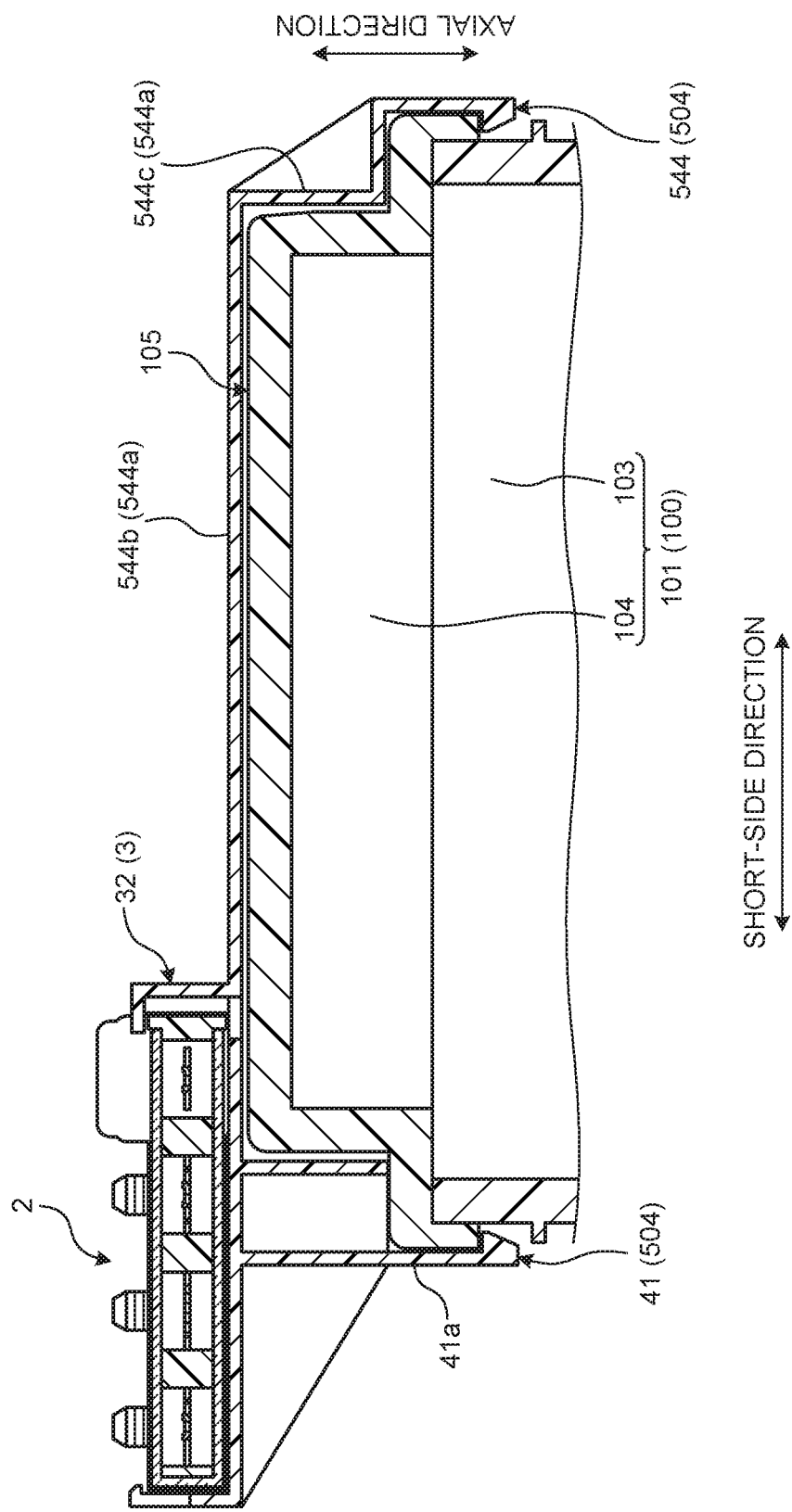
FIG. 28 is a cross-sectional view of a portion, which includes an engagement claw portion, of the fuse unit according to the fifth embodiment.
Figure 29:
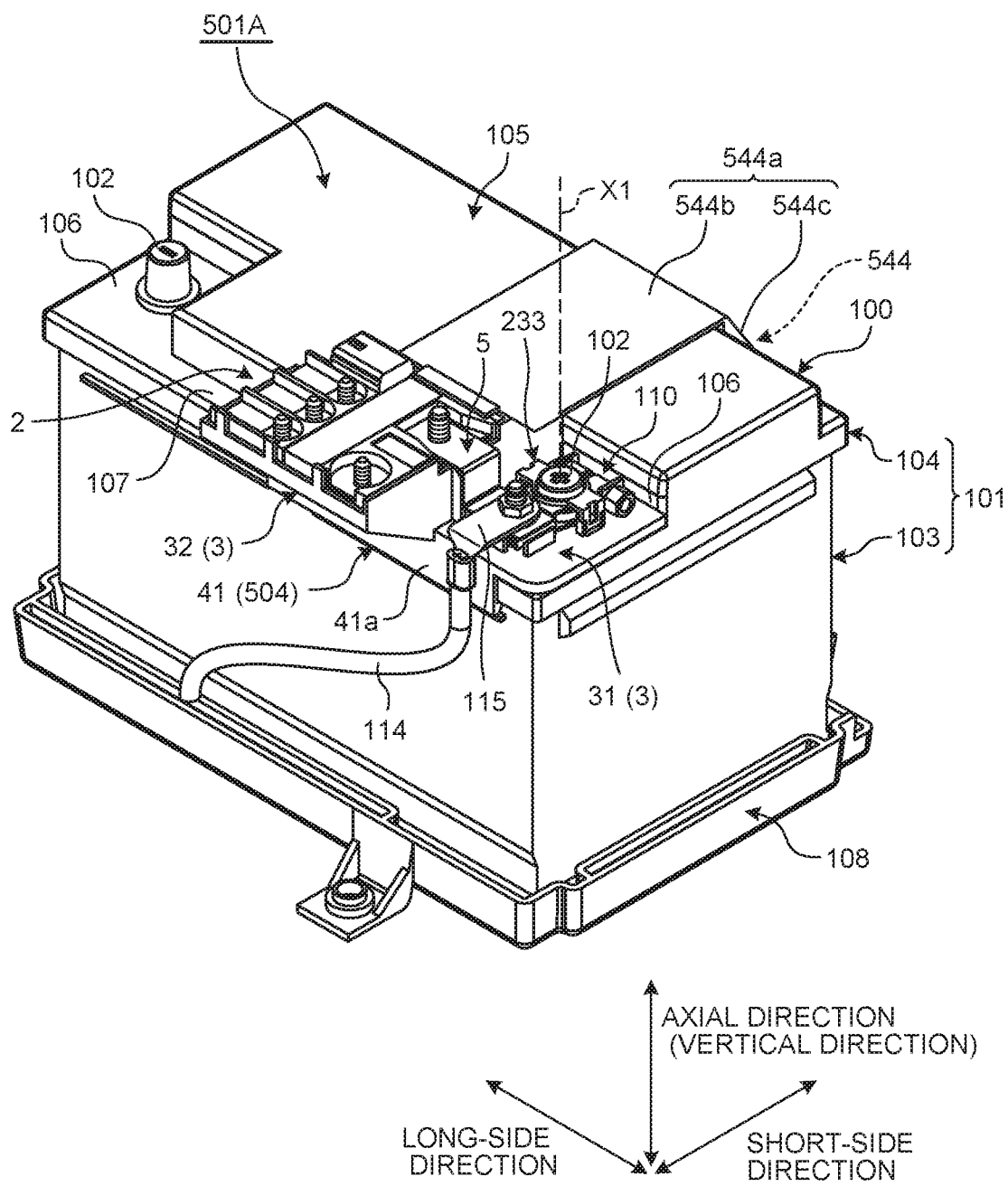
FIG. 29 is a perspective view illustrating the schematic structure of a battery to which a fuse unit according to a modification is applied.

FIG. 27 is a perspective view illustrating the schematic structure of a battery to which a fuse unit according to a fifth embodiment is applied. FIG. 28 is a cross-sectional view of a portion, which includes an engagement claw portion, of the fuse unit according to the fifth embodiment. FIG. 29 is a perspective view illustrating the schematic structure of a battery to which a fuse unit according to a modification is applied. The fuse unit according to the fifth embodiment is different from the fuse unit according to the first embodiment in terms of a position at which the engagement claw portion of a locking mechanism is provided. The repeated description of components, action, and effects, which are common to the above-mentioned embodiments, will be omitted as much as possible, and the schematic structure of the fuse unit will appropriately refer to the other drawings.

As illustrated in FIGS. 27 and 28, a fuse unit 501 according to this embodiment includes the above-mentioned fusible link 2, the protector 3 serving as a holding mechanism, a locking mechanism 504, and the connecting bus bar 5.

Further, the locking mechanism 504 is to lock the protector 3 on the post-standing surface 105. The locking mechanism 504 of this embodiment includes locking claw portions 41 and 544 that lock the protector 3 on the post-standing surface 105 by being engaged with the battery housing 101. That is, the locking mechanism 504 of this embodiment includes the locking claw portion 544 instead of the above-mentioned locking claw portion 42. A plurality of locking claw portions 41 and 544, here, two locking claw portions are provided and are engaged with a plurality of surfaces of the battery housing 101, here, two surfaces of the battery housing 101 orthogonal to each other.

The locking claw portion 41 is formed integrally with the base portion 31 of the protector 3 through a plate-like portion 41a extending in the vertical direction in the assembled state as described above.

Meanwhile, the locking claw portion 544 is formed integrally with the base portion 31 and the holding portion 32 of the protector 3 through a support plate 544a extending in the short-side direction in the assembled state. The support plate 544a includes a body portion 544b that extends in the short-side direction from the base portion 31 and the holding portion 32 in the assembled state, and a bent portion 544c that extends downward in the vertical direction from an end portion of the body portion 544b opposite to an end portion of the body portion 544b close to the protector 3 (the base portion 31 and the holding portion 32), t stepped portion is formed at the bent portion 544c in accordance with the shape of the lid member 104. The locking claw portion 544 is formed integrally with the bent portion 544c at an end portion (the lower end portion in the vertical direction in a state in which the protector 3 is assembled on the post-standing surface 105 of the battery 100) of the bent portion 544c of the support plate 544a. The locking claw portion 544 is formed in a hook shape in which the end portion of the bent portion 544c is bent (see FIG. 28 and the like).

The locking claw portion 544 and the bent portion 544c of the support plate 544a are formed at a position facing the side surface of the battery housing 101 along the long-side direction of the lid member 104 in the assembled state, here, the side surface that faces the surface of the battery housing 101, with which the locking claw portion 41 is to be engaged, in the short-side direction. The locking claw portion 544 and the bent portion 544c of the support plate 544a are formed so as to extend in the long-side direction in the assembled state.

Here, the locking claw portions 41 and 544 are engaged with the lower end faces of the edge portions of the lid member 104 of the battery housing 101 in the vertical direction. When the locking claw portions 41 and 544 are engaged with the lower end face of the lid member 104 in the vertical direction at predetermined positions in a state in which the protector 3 is assembled on the post-standing surface 105 of the battery 100, the locking mechanism 504 can lock the protector 3 on the post-standing surface 105.

Since the above-mentioned fuse unit 501 holds the fusible link 2 on the post-standing surface 105 of the battery housing 101 by the holding portion 32 connected to the base portion 31 of the protector 3 and receives the load of the fusible link 2 on the post-standing surface 105, a load acting on the battery terminal 110 from the fuse unit 501 can be suppressed. Accordingly, a load acting on the battery post 102 can be suppressed. Further, in a case in which a space required to install the fuse unit 501 cannot be ensured around the side surfaces of the battery housing 101, an installation space can be ensured on the post-standing surface 105 of the battery housing 101 (the upper surface of the battery housing 101 in the vertical direction) so that the fusible link 2 of the fuse unit 501 can be disposed. Therefore, the fusible link 2 can be appropriately provided.

Furthermore, the above-mentioned fuse unit 501 can reliably assemble the protector 3 and the fusible link 2 on the post-standing surface 105 by the locking mechanism 504.

In addition, when the locking claw portions 41 and 544 are engaged with the battery housing 101, the above-mentioned fuse unit 501 can lock the protector 3 and the fusible link 2 on the post-standing surface 105.

Moreover, since the locking claw portions 41 and 544 are engaged with the two surfaces of the battery housing 101 facing each other and can lock the protector on the post-standing surface 105, the above-mentioned fuse unit 501 can more reliably assemble the protector 3 on the post-standing surface 105.

Meanwhile, as illustrated in a modification exemplified in FIG. 29, the above-mentioned locking mechanism 504 may be applied to the above-mentioned fuse unit 201 so as to form a fuse unit 501A. Even in this case, when the locking claw portions 41 and 544 are engaged with the battery housing 101, the fuse unit 501A can lock the protector 3 and the fusible link 2 on the post-standing surface 105. Accordingly, the fuse unit 501A can reliably assemble the protector 3 and the fusible link 2 on the post-standing surface 105.

Meanwhile, a fuse unit according to an embodiment of the above-mentioned invention is not limited to the above-mentioned embodiments, and can be changed in various ways without departing from the scope of claims. The fuse unit according to this embodiment may be formed of the appropriate combination of the components of the respective embodiments and modifications that have been described above.

The fusible link 2 has been described in the above description as a component in which the fuse element 21 and the stud bolts 22 are embedded in and integrated with the housing 23 by insert molding or the like, but is not limited thereto.

In the above description, the holding portion 32 of the protector 3 has been formed integrally with the base portion 31 so as to be adjacent to the base portion 31 in the long-side direction. However, the holding portion 32 is not limited thereto, and may be formed integrally with the base portion 31 so as to be adjacent to the base portion 31 in the short-side direction.

Further, the above-mentioned fuse unit may not include the locking mechanism.

Furthermore, the above-mentioned fuse unit, which is applied to the battery 100 including the recess 106 formed on the post-standing surface 105, has been described. However, the fuse unit is not limited thereto, and may be applied to a battery of which a post-standing surface 105 is flat and does not include the recess 106. In this case, the base portion 31, the holding portion 32, the connecting bus bar 5, and the like, which have been described above, of the fuse unit are formed in a substantially flat shape.

REFERENCE SIGNS LIST 1, 201, 301, 401, 401A, 501, 501A fuse unit
2 fusible link
3 protector (holding mechanism)
4, 404, 504 locking mechanism
5 connecting bus bar
21 fuse element
21c fuse body
31 base portion
32 holding portion
41, 42, 443, 544 locking claw portion
100 battery
101 battery housing
102 battery post
105 post-standing surface
108 installation tray (connected member)
110 battery terminal
233 mounting portion
306, 306A, 306B terminal positioning mechanism
306a, 306b, 306c, 306f, 306g recess
306d, 306e protrusion
307 terminal base

The invention claimed is:

1. A fuse unit comprising:
a fusible link that is connected to a battery terminal and of which a fuse is fused when overcurrent flows therein;
a holding mechanism including a base portion that is interposed between a post-standing surface and the battery terminal in a state in which the battery terminal is fastened to a battery post provided on the post-standing surface of a battery housing, and a holding portion that is connected to the base portion and holds the fusible link on the post-standing surface; and
a mounting portion which is mounted to the battery terminal, in a direction from the battery terminal to the post-standing surface, and is locked to a plurality of engagement claw portions from the base portion.

2. The fuse unit according to claim 1, wherein
the holding mechanism includes the mounting portion that mounts the battery terminal on the base portion at a position where the battery terminal is capable of being fastened to the battery post.

3. The fuse unit according to claim 2, further comprising: a terminal positioning mechanism that includes a plurality of recesses provided on one of a side of the battery terminal or a side of the base portion and a protrusion provided on another side of the battery terminal or the side of the base portion and fitted to any of the plurality of recesses, and positions the battery terminal on the base portion at a position where the battery terminal is capable of being fastened to the battery post.

4. The fuse unit according to claim 1, further comprising: a terminal positioning mechanism that includes a plurality of recesses provided on one of a side of the battery terminal or a side of the base portion and a protrusion provided on another side of the battery terminal or the side of the base portion and fitted to any of the plurality of recesses, and positions the battery terminal on the base portion at a position where the battery terminal is capable of being fastened to the battery post.

5. The fuse unit according to claim 1, wherein the battery terminal is not integral with the base portion and is connected to the base portion by connection with the battery post in a state in which the base portion interposes the battery terminal and the post-standing surface in an axial direction of the battery post, and wherein the axial direction is a direction in which the battery post extends from the post-standing surface to the battery terminal.

6. The fuse unit according to claim 1, wherein the base portion and the holding portion are integral such that a load from the fusible link is suppressed from acting on the battery post.

7. The fuse unit according to claim 1, wherein the base portion comprises an insertion hole therein through which the battery post is inserted to the battery terminal.

8. The fuse unit according to claim 7, wherein the insertion hole of the base portion surrounds a circumference of the battery post.

9. The fuse unit according to claim 7, wherein the base portion comprises the insertion hole therein through which the battery post is inserted to the battery terminal, and wherein the battery terminal is separated from the post-standing surface by the base portion.

10. The fuse unit according to claim 7, wherein the base portion comprises the plurality of engagement claw portions, at opposite sides of the insertion hole, projecting in an axial direction to the battery terminal and locked to the mounting portion covering the battery terminal, wherein the axial direction is a direction in which the battery post is inserted through the insertion hole to the battery terminal.

11. The fuse unit according to claim 1, wherein the holding mechanism further comprises a plurality of engagement claw portions locked to a plurality of portions of a lid member of a battery having the battery post, the plurality of portions being on opposite sides of the battery.

* * * * *